United States Patent
Wang et al.

(10) Patent No.: US 11,132,421 B1
(45) Date of Patent: Sep. 28, 2021

(54) ENHANCED INFORMATION EXTRACTION FROM WEB PAGES

(71) Applicant: FUJITSU LIMITED, Kawasaki (JP)

(72) Inventors: Jun Wang, San Jose, CA (US); Kanji Uchino, Santa Clara, CA (US); Gang Zou, Suzhou (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/039,766

(22) Filed: Sep. 30, 2020

(51) Int. Cl.
*G06F 40/174* (2020.01)
*G06F 16/958* (2019.01)
*G06N 5/02* (2006.01)
*G06F 40/169* (2020.01)
*G06F 16/951* (2019.01)

(52) U.S. Cl.
CPC ......... *G06F 16/972* (2019.01); *G06F 16/951* (2019.01); *G06F 16/986* (2019.01); *G06F 40/169* (2020.01); *G06N 5/025* (2013.01)

(58) Field of Classification Search
CPC .... G06F 16/972; G06F 16/951; G06F 40/169; G06F 16/986; G06N 5/025
USPC ....................................................... 715/760
See application file for complete search history.

(56) References Cited

U.S. PATENT DOCUMENTS

| 10,628,630 B1* | 4/2020 | Surace | G06K 9/6267 |
| 10,839,147 B1* | 11/2020 | Chernov | G06F 40/174 |
| 10,990,645 B1* | 4/2021 | Shi | G06N 3/08 |
| 2014/0258828 A1* | 9/2014 | Lymer | G06F 40/174 715/224 |
| 2014/0380105 A1* | 12/2014 | Michel | G06F 11/0709 714/57 |
| 2015/0205777 A1* | 7/2015 | Campanelli | G06K 9/00449 715/226 |
| 2015/0279310 A1* | 10/2015 | Itakura | G06T 1/20 345/520 |
| 2015/0281334 A1* | 10/2015 | Ushiki | G06F 16/9577 709/203 |

(Continued)

OTHER PUBLICATIONS

Gulhane, Pankaj, Amit Madaan, Rupesh Mehta, Jeyashankher Ramamirtham, Rajeev Rastogi, Sandeep Satpal, Srinivasan H. Sengamedu, Ashwin Tengli, and Charu Tiwari. "Web-scale information extraction with vertex." In 2011 IEEE 27th International Conference on Data Engineering, pp. 1209-1220. IEEE, 2011.

(Continued)

*Primary Examiner* — Hassan Mrabi
(74) *Attorney, Agent, or Firm* — Fujitsu Patent Center

(57) ABSTRACT

In an embodiment, operations include crawling a set of web pages and labeling one or more items of a first web page based on user input. Each item corresponds to a node in a first tree data structure of the first web page. The operations further include generating a first extraction rule to extract a first item from the one or more first items. The first extraction rule includes a first path, in the first tree data structure, for a first node of the first item, and includes first visual information of each node in the first path. The operations further include comparing the first visual information in the first path with second visual information of each of a plurality of candidate nodes in a second tree data structure of a second web page and further refining the first extraction rule to generate a second extraction rule.

20 Claims, 20 Drawing Sheets

(56) References Cited

U.S. PATENT DOCUMENTS

2019/0156198 A1* 5/2019 Mars .................. G06N 20/20

OTHER PUBLICATIONS

Cohen, Joseph Paul, Wei Ding and A. Bagherjeiran. "XTreePath: A generalization of XPath to handle real world structural variation." arXiv: 1505.01303v3 [cs.IR](Dec. 27, 2017): n. pag.

* cited by examiner

300B

```
<div id="class-2-wide" class="flathand">
    ::before
<div id="main_top" class="main">
    <div class="title-overview">
        <script> ... </script>
        <div id="title-overview-widget" class="heroic-overview">
            <div class="vital"> ... </div>
            <div class ="plot_summary_wrapper">
                <script> ... </script>
                <div style="margin-top: 10px; margin-bottom: 10px">
                    <div style="margin-top: 10px; margin-bottom: 10px">
                        "An action, comedy, and crime based movie with a
                        nice plot and great performance"
                    </div>
                    <div style="margin-top: 10px; margin-bottom: 10px">
                        <h4 class="inline">Director </h4>
                        <a href="/name/nm0236226/?ref=tt_ov_dr">Mr. A</a>
                    </div>
                    <div style="margin-top: 10px; margin-bottom: 10px">
                        <h4 class="inline">Writer </h4>
                        <a href="/name/nm0343336/?ref=tt_ov_wr">Mr. Q</a>
                    </div>
                    <div style="margin-top: 10px; margin-bottom: 10px">
                        <h4 class="inline">Stars </h4>
                        <a href="/name/nm04433464/?ref=tt_ov_st">Mr. B</a>
                        <a href="/name/nm05533465/?ref=tt_ov_st">Mr. C</a>
                        <a href="/name/nm06553242/?ref=tt_ov_st">Mr. D</a>
                        <span class="ghost">|</span>
                        <a href="fullcredits/?ref=tt_ov_st">See full cast and credit</a>
                    </div>
                </div>
            </div>
        </div>
    </div>
</div>
```

Labels: 308, 310A, 310B, 312, 314A, 314B, 314C, 314D

```
function dynamit_cal(xpath1, index1, xpath2, index2, score){
    let n1 = xpath1[index1] //xpath1 is the sample xpath with every nodes and parameters
                            //index1 the index of the xpath where to compute similarity
    let n2 = xpath2[index2]
    let newScore = score+calSim(n1, n2) //calculate score
    int maxScore = newScore;
    for( let i=index1+1; i<xpath1.length; i++){
        for( let j=index2+1; j<xpath2.length; j++){
            score = dynamit_cal( xpath1, i, xpath2, j, newScore )}//find the rest best score
            if( score>maxScore ){
                score = maxScore;
            }
        }
    }
    return score;
}
```

1402

1406

```
function calSim(node1, node2){
    let score = 0;
    score+= node_width_sim(node1,node2);
    score+=node_heigth_sim(node1,node2);
    ......
    return score/xpath1.length
}
```

```
...
    <div style="margin-top:10px; margin-bottom:10px">
        <script> ... </script>
        <div> ... </div>
        <div style="margin-top:10px; margin-bottom:10px">
            <div style="margin-top:10px; margin-bottom:10px">
1602A        "
                A young woman, while attempting
                to save her father during a Category 5 hurricane,
                finds herself trapped in a flooding house and must
                fight for her life against alligators
                "
            </div>
            <div style="margin-top: 10px; margin-bottom: 10px">
1602B        <h4 class="inline">Director </h4>
                <a href="/name/nm0014960/?ref=tt_ov_dr">Mr. A</a>
            </div>
            <div style="margin-top: 10px; margin-bottom: 10px">
                <div>
                    <div> == $0
1602C                <h4 class="inline">Writer </h4>
                        <a href="/name/nm1726531/?ref=tt_ov_wr">Mr. Q</a>
                        " , "
                        <a href="/name/nm1726531/?ref=tt_ov_wr">Mr. B</a>
                    </div>
                </div>
            </div>
            <div class="credit_summary_item"> ... </div>
        </div>
        <script> ... </script>
        <!-- To display Pro Title CTA above the watchlist for in-
            development titles -->
        <div class="wlb-title-main-details">
            <span class="full-wl-button ribbonize" data-tconst"
                "tt8364368" data-recordmetrics="true" style="position:
                relative;">
                <div class="wl-ribbon fullsize retina not - inWL"
                title="Click tto add to watchlist">
                    <div class="container">
                        <span class="text">
                            ::after
...
```

*FIG. 16*

ENHANCED INFORMATION EXTRACTION FROM WEB PAGES

FIELD

The embodiments discussed in the present disclosure are related to extraction of information from web pages.

BACKGROUND

Many new technologies are being developed for extraction of information from data sources to generate knowledge bases or information repositories. Such knowledge bases or information repositories may be used in an organization for various purposes, such as, market research, business research, human resource management, product development, and the like. The data sources may include data of various types such as, structured data that may be represented in a database, and un-structured or semi-structured data that may not as such be represented in a database for further processing. Examples of the semi-structured data may include semi-structured web pages, which may be a rich source of information. Unlike the structured data sources, the extraction of information from such semi-structured web pages may not be a straightforward task as it may require manual annotation of a large number of sample web pages. Further, data items of even similar type may be positioned at different locations within the different semi-structured web pages, which may reduce an accuracy to correctly extract different information from the semi-structured web pages.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, operations may include crawling a set of web pages associated with one or more web sites of a category. The operations may further include selecting a first web page, as a sample page, from the crawled set of web pages. The selected first web page may include a first set of items, and each of the first set of items may correspond to a node in a first tree data structure associated with presentation of the first set of items in the first web page. The operations may further include receiving a user input and labelling one or more first items from the first set of items in the selected first web page based on the received user input. The operations may further include generating a first extraction rule to extract a first item from the labelled one or more first items. The first extraction rule may include a first path, in the first tree data structure, for a first node associated with the first item, and may further include first visual information associated with each node in the first path. The operations may further include selecting a second web page, from a set of target web pages included in the crawled set of web pages. The operations may further include comparing the first visual information associated with each node in the first path with second visual information associated with each of a plurality of candidate nodes in a second tree data structure associated with the selected second web page. The operations may further include selecting a second node from the plurality of candidate nodes in the second tree data structure based on the comparison. The selected second node may correspond to the first item. The operations may further include refining the first extraction rule to generate a second extraction rule for extraction of a second item from the selected second web page. The second extraction rule may include a second path for the selected second node in the second tree data structure and the second visual information for each node in the second path.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 3A, 3B, and 3C, collectively illustrate, an example web page, exemplary tree data structure associated with presentation of items in the web page, and exemplary extraction rule for extraction of an item of the web page, respectively;

FIG. 14 is a diagram that illustrates an exemplary pseudo-code associated with a determination of a normalized candidate path score of a candidate path for a candidate node in a second tree data structure of a second web page;

FIG. 16 is a diagram that illustrates an exemplary second tree data structure including a plurality of candidate nodes for a second item of the second web page, all according to at least one embodiment described in the present disclosure.

DESCRIPTION OF EMBODIMENTS

Figure 1:
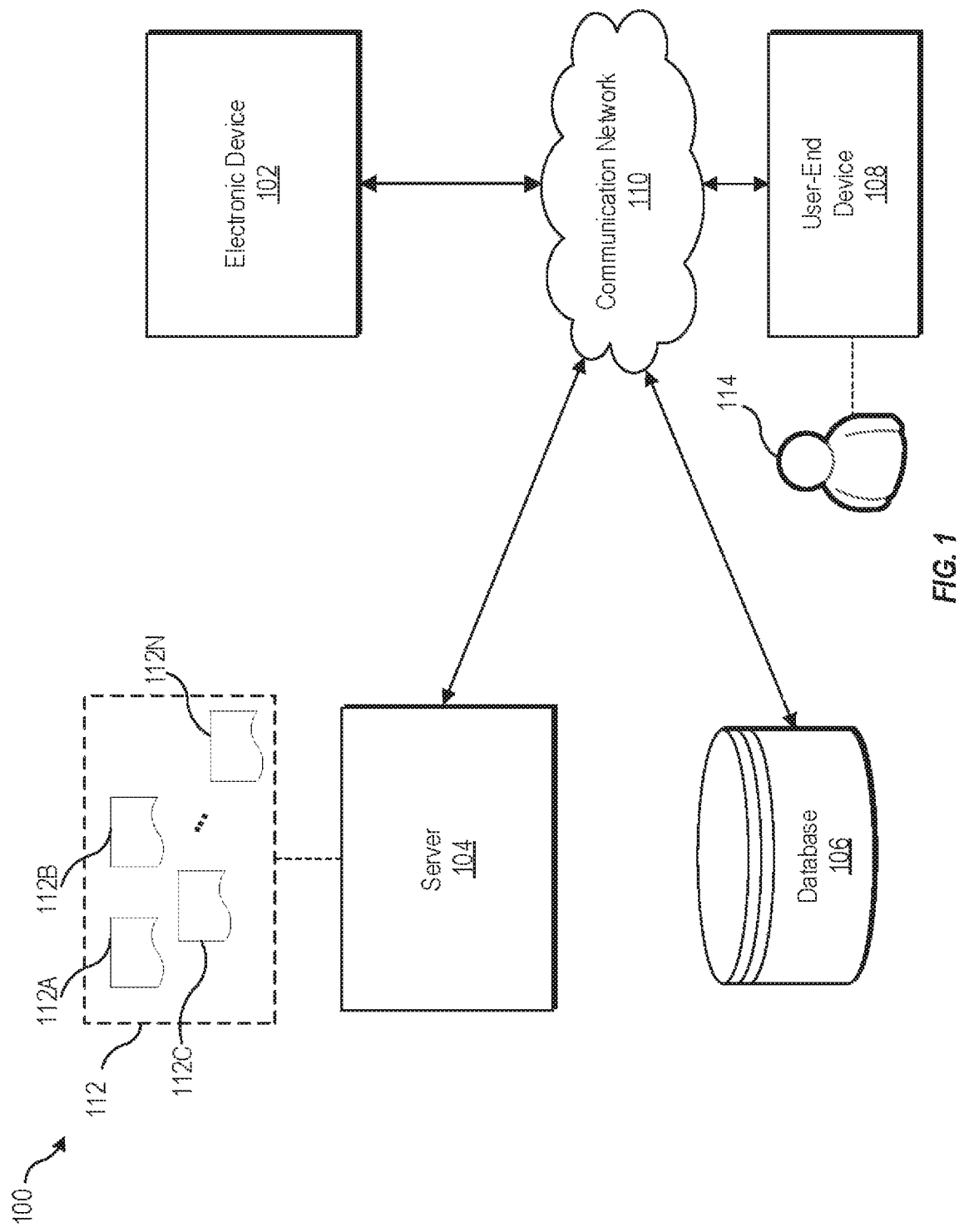
FIG. 1 is a diagram representing an example environment related to information extraction from web pages.

Some embodiments described in the present disclosure relate to methods and systems for enhanced and effective extraction of information from web pages. In the present disclosure, a set of web pages associated with one or more web sites may be crawled for extraction of information from the set of web pages. Further, one or more items in a sample web page, of the set of crawled web pages, may be labelled or selected based on a user input. An initial extraction rule may be generated for extraction of a first item from the labelled one or more items of the sample web page based on tree data structure and visual information associated with the first item. The initial extraction rule may be further refined to generate a new extraction rule for extraction of a second item (i.e. corresponding to the first item) from a target web page in the set of crawled web pages. The new extraction rule, so generated, may be automatically and incrementally refined for other target web pages for effective and enhanced extraction of an item from each such target web page based on the visual information associated with the item to be extracted.

According to one or more embodiments of the present disclosure, the technological field of information extraction from web pages may be improved by configuring a computing system in a manner the computing system may be able to effectively extract items of similar types from different web pages. The computing system may require a user input for labelling of one or more items (or types of items) from a single web page for further extraction of such items (or types of items) from target web pages automatically, as compared to other conventional systems which may require user input for labelling of items from a large number of web pages.

The system may be configured to crawl a set of web pages associated with one or more web sites of a category. For example, the one or more web sites may be movie review and rating web sites. The system may be further configured to select a first web page, as a sample web page, from the crawled set of web pages. For example, a web page of movies review web site may be selected as the first or sample web page. The selected first web page may include a first set of items. For example, the web page for the movie may include items such as, but are not limited to, a movie name and release year, a movie rating, a movie poster icon, a movie trailer video, a review of the movie, and a list of cast and crew of the movie.

Each of the first set of items may correspond to a node in a first tree data structure associated with presentation of the first set of items in the first web page. For example, the first web page of the movie may have HTML content in an XML format represented as a document object model (DOM) tree that may include multiple nodes. Each node of the DOM tree may correspond to a certain item in the first web page, and the DOM tree may be associated with presentation of the items in the first web page. For example, the DOM tree may include a node for the movie name and release year, another node for the movie poster icon, and another different node for the list of cast and crew of the movie, and so on. Further, the DOM tree may be associated with a visual presentation of the various items such as, movie name, release year, movie poster icon, and list of cast and crew, and the like, on the web page. The DOM tree associated with the items of the web pages are described further, for example, in FIGS. 3B and 16.

The system may be further configured to receive a user input and label one or more first items from the first set of items of the selected first web page based on the received user input. For example, based on the user input, the system may label items such as movie name, release year, and the list of cast and crew in the selected web page of the movie. The system may be further configured to generate a first extraction rule to extract a first item from the labelled one or more first items. The extraction rule may include a first path, in the first tree data structure, for a first node associated with the first item, and may further include first visual information associated with each node in the first path. For example, for the first item "movie name", the system may determine the first node (corresponding to the labelled first item) in the first tree data structure (i.e., the DOM tree) associated with the web page of the movie. The system may determine an XPath of the first node in the DOM tree as the first path and visual properties of each node in the XPath as the visual information as described further, for example, in FIG. 3C.

The system may be further configured to select a second web page from a set of target web pages. For example, the system may select a web page of documentary film as the second web page. The system may search a plurality of candidate nodes in a second tree data structure (e.g., a DOM tree) associated with the selected second web page. The plurality of candidate nodes may be potential nodes for a second item (e.g., a documentary film name), corresponding to the first item (e.g., the movie name), in the second web page. The system may be configured to compare the first visual information associated with each node in the first path with second visual information associated with each of the plurality of candidate nodes in the second tree data structure associated with the selected second web page.

The system may be configured to select a second node from the plurality of candidate nodes in the second tree data structure based on the comparison of the first visual information with the second visual information. The selected second node may correspond to the first item. The system may be configured to refine the first extraction rule to generate a second extraction rule for extraction of the second item from the selected second web page. The second extraction rule may include a second path (e.g., an XPath) for the selected second node in the second tree data structure (e.g., a DOM tree) of the second web page and the second visual information (e.g., visual properties) for each node in the second path. The refinement of the first extraction rule is described further, for example, in FIGS. 8A, 8B, and 8C.

Typically, a group of web pages of a certain category may include similar types of items. However, many-a-times. the placement of these similar items in different web pages of the same category may be different. Due to such different placements or positions of items in different web pages, nodes associated with these similar items may have different locations in DOM trees of the respective web pages. The disclosed system generates an XPath, in a DOM tree of a sample page, for the node of an item in the sample page. Further, the disclosed system compares visual information of each node in the generated XPath in the sample page with visual information of each candidate node in a DOM tree of a target page. The candidate node with a closest match of visual information may be selected as a node in the DOM tree of the target page for the similar item to be extracted from the target page. Thus, for the extraction of items from the web pages, since the disclosed system depends on visual characteristics of the items and may be independent of different positions or placements of items on different web pages, the disclosed system may be more robust in extraction of information or items, than the conventional systems. Further, the disclosed system may require manual annotation (or labelling) of only a single sample web page and may provide automatic extraction from the target web pages based on the annotated sample page, as against a requirement of manual annotations of a large number of web pages in the case of conventional systems.

Embodiments of the present disclosure are explained with reference to the accompanying drawings.

FIG. 1 is a diagram representing an example environment related to information extraction from web pages, arranged in accordance with at least one embodiment described in the present disclosure. With reference to FIG. 1, there is shown an environment 100. The environment 100 may include an electronic device 102, a server 104, a database 106, a user-end device 108, and a communication network 110. The electronic device 102, the server 104, the database 106, and the user-end device 108 may be communicatively coupled to each other, via the communication network 110. In FIG. 1, there is further shown a set of web pages 112 of one or more web sites of a particular category. The set of web pages 112 may be stored in the database 106, for example, after the set of web pages 112 have been crawled. The set of web pages may include a first web page 112A, a second web page 112B, . . . and an Nth web page 112N. There is further shown a user 114 who may be associated with or operating the electronic device 102 or the user-end device 108.

The electronic device 102 may comprise suitable logic, circuitry, interfaces, and/or code that may be configured to crawl the set of web pages 112 from one or more web sites of a category hosted on the server 104. The electronic device 102 may store the crawled set of web pages 112 in the database 106. The electronic device 102 may be further configured to select the first web page 112A, as a sample web page, from the crawled set of web pages 112. The first web page 112A may include a first set of items, each of which may correspond to a node in a first tree data structure associated with presentation of the first set of items in the first web page 112A. The electronic device 102 may receive a user input from the user 114 and label one or more first items from the first set of items in the sample web page based on the received user input.

The electronic device 102 may be further configured to generate a first extraction rule to extract a first item from the labelled one or more first items, from the first web page. The first extraction rule may include a first path, in the first tree data structure, for a first node associated with the first item, and further may include first visual information associated with each node in the first path. The electronic device 102 may be further configured to select the second web page 112B from the set of target web pages included in the crawled set of web pages 112. The electronic device 102 may then compare the first visual information associated with each node in the first path with second visual information associated with each of a plurality of candidate nodes in a second tree data structure associated with the selected second web page 112B. The electronic device 102 may be further configured to select a second node from the plurality of candidate nodes in the second tree data structure based on the comparison. The selected second node may correspond to the first item.

The electronic device 102 may be configured to refine the first extraction rule to generate a second extraction rule for extraction of a second item from the selected second web page 112B. The second item may correspond to the first item, in the second web page 112B. The second extraction rule may include a second path for the selected second node in the second tree data structure and the second visual information for each node in the second path. In an embodiment, the electronic device 102 may be configured to extract the second item from the second web page 112B based on the second node and the second path in the second tree data structure. The electronic device 102 may be configured to incrementally refine the first extraction rule for other target web pages in the crawled set of web pages 112, for extraction of an item corresponding to the first item from the respective target web page. The electronic device 102 may extract such items from the respective target web pages and store the extracted items in a knowledge base or data repository, such as, the database 106. The extraction of items from web pages is explained further, for example, in FIGS. 4A and 4B.

Examples of the electronic device 102 may include, but are not limited to, a web wrapper device, a mobile device, a desktop computer, a laptop, a computer work-station, a computing device, a mainframe machine, a server, such as a cloud server, and a group of servers. In one or more embodiments, the electronic device 102 may include a user-end terminal device and a server communicatively coupled to the user-end terminal device. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

The server 104 may comprise suitable logic, circuitry, interfaces, and/or code that may be configured to host the set of web pages 112 of a category. For example, the server 104 may host one or more web sites including the set of web pages 112, which may be crawled by the electronic device 102 to extract information from the set of target web pages in the set of web pages 112. Examples of the server 104 may include, but are not limited to, a web server, a database server, a file server, a media server, an application server, a mainframe server, or a cloud computing server. In one or more embodiments, the electronic device 102 may include the server 104. The server 104 may be implemented using hardware including a processor, a microprocessor (e.g., to perform or control performance of one or more operations), a field-programmable gate array (FPGA), or an application-specific integrated circuit (ASIC). In some other instances, the server 104 may be implemented using a combination of hardware and software.

The database 106 may comprise suitable logic, interfaces, and/or code that may be configured to store the set of web pages 112 that may be crawled by the electronic device 102 from the one or more web sites hosted on the server 104. The database 106 may further store the one or more first items labelled in the first web page 112A, the first item extracted from the first web page 112A, and items corresponding to the first item extracted from the set of target web pages in the set of web pages 112.

The database 106 may be a relational or a non-relational database. Also, in some cases, the database 106 may be stored on a server, such as a cloud server or may be cached and stored on the electronic device 102. The server of the database 106 may be configured to receive a request for a web page in the set of web pages 112 from the electronic device 102, via the communication network 110. In response, the server of the database 106 may be configured to retrieve and provide the requested web page to the electronic device 102 based on the received request, via the communication network 110. Additionally, or alternatively, the database 106 may be implemented using hardware including a processor, a microprocessor (e.g., to perform or control performance of one or more operations), a field-programmable gate array (FPGA), or an application-specific integrated circuit (ASIC). In some other instances, the database 106 may be implemented using a combination of hardware and software.

The user-end device 108 may comprise suitable logic, circuitry, interfaces, and/or code in which one or more extraction rules may be deployed to extract information, including one or more items, from a target web page. The user-end device 108 may include a web browser software to browse and crawl the set of web pages 112 from the one or more web sites hosted on the server 104. Further, user-end device 108 may include a web page annotation tool to label the one or more first items in the first web page (i.e., a sample web page) based on a user input received from the user 114. Examples of the user-end device 108 may include, but are not limited to, a web software development or testing device, a mobile device, a desktop computer, a laptop, a computer work-station, a computing device, a mainframe machine, a server, such as a cloud server, and a group of servers. Although in FIG. 1, the user-end device 108 is separated from the electronic device 102; however, in some embodiments, the user-end device 108 may be integrated in the electronic device 102, without a deviation from the scope of the disclosure.

The communication network 110 may include a communication medium through which the electronic device 102 may communicate with the server 104, the server which may store the database 106, and the user-end device 108. Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 106 and the user-end device 108. In addition, in some embodiments, the functionality of each of the database 106 and the user-end device 108 may be incorporated into the electronic device 102, without a deviation from the scope of the disclosure.

Figure 2:
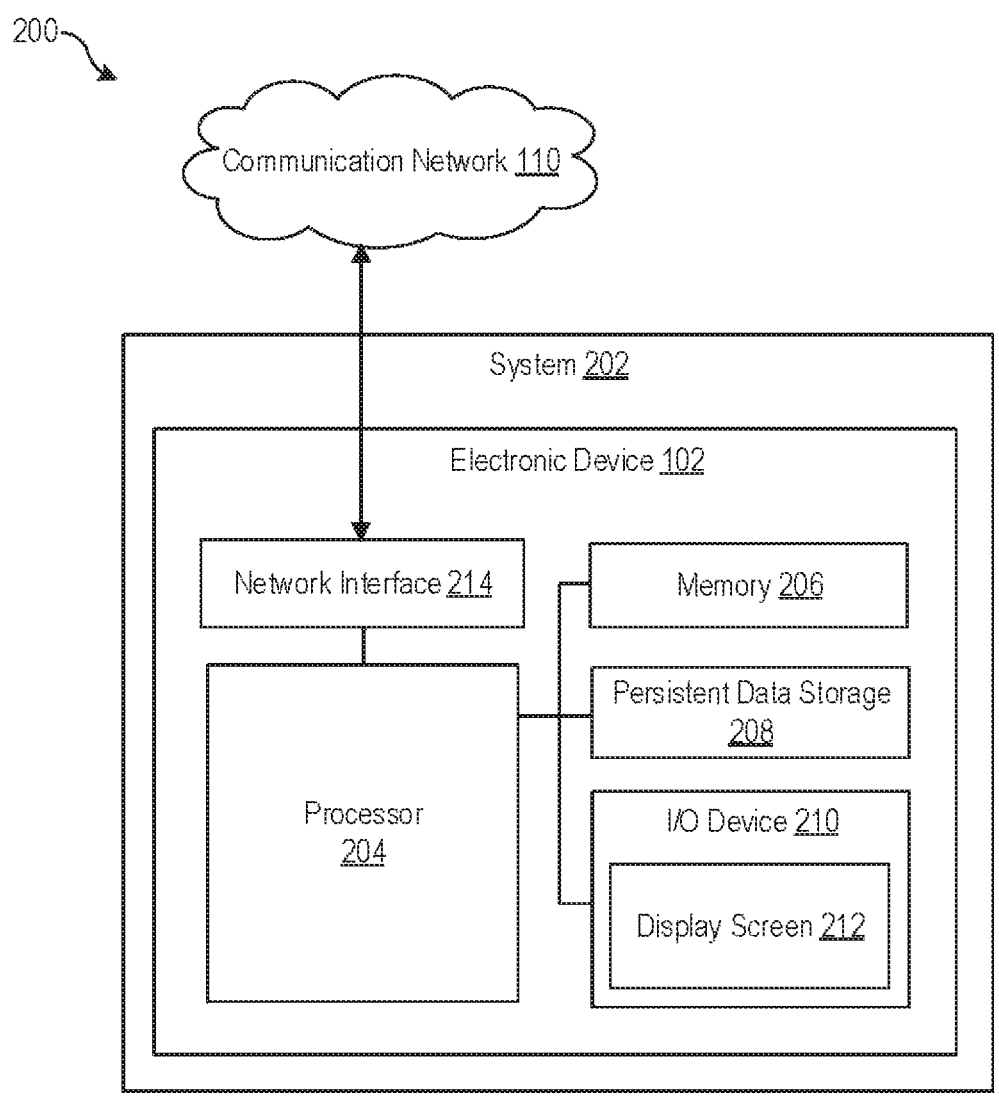
FIG. 2 is a block diagram that illustrates an exemplary electronic device for information extraction from web pages.

FIG. 2 is a block diagram that illustrates an exemplary electronic device for information extraction from web pages, arranged in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, a persistent data storage 208, an input/output (I/O) device 210, a display screen 212, and a network interface 214.

The processor 204 may comprise suitable logic, circuitry, and/or interfaces that may be configured to execute program instructions associated with different operations to be executed by the electronic device 102. For example, some of the operations may include crawling the set of web pages 112, selecting the first web page 112A, receiving the user input, generating the first extraction rule, selecting the second web page 112B, comparing the first visual information with the second visual information, selecting the second node, and/or refining the first extraction rule to generate the second extraction rule. The operations may further include extracting the second item from the second web page 112B based on the generated second extraction rule. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a GPU, a CPU, a RISC processor, an ASIC processor, a CISC processor, a co-processor, and/or a combination thereof.

The memory 206 may comprise suitable logic, circuitry, interfaces, and/or code that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may comprise suitable logic, circuitry, interfaces, and/or code that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or a special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer.

Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may store the crawled set of web pages 112 retrieved from the database 106, the labelled one or more first items, the first extraction rule, and the second extraction rule. Either of the memory 206, the persistent data storage 208, or combination may further store the extracted first item from the first web page 112A, the extracted second item from the second web page 112B, and an item corresponding to the extracted first item, from each of the set of target web pages.

The I/O device 210 may include suitable logic, circuitry, interfaces, and/or code that may be configured to receive a user input. For example, the I/O device 210 may receive the user input to select the first web page 112A, as the sample page, from the crawled set of web pages 112, and the user input to select the one or more first items from the first set of items of the first web page 112A for labelling of the one or more first items. The I/O device 210 may be further configured to provide an output in response to the user input. The I/O device 210 may include various input and output devices, which may be configured to communicate with the processor 204 and other components, such as the network interface 214. Examples of the input devices may include, but are not limited to, a touch screen, a keyboard, a mouse, a joystick, and/or a microphone. Examples of the output devices may include, but are not limited to, a display and a speaker.

The display screen 212 may comprise suitable logic, circuitry, interfaces, and/or code that may be configured to render the first web page 112A and items (corresponding to the first item) extracted from the set of target web pages. The display screen 212 may be configured to receive the user input from the user 114 to select the one or more first items in the first web page 112A. In such cases the display screen 212 may be a touch screen to receive the user input. The display screen 212 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 214 may comprise suitable logic, circuitry, interfaces, and/or code that may be configured to establish a communication between the electronic device 102, the server 104, the database 106, and the user-end device 108, via the communication network 110. The network interface 214 may be implemented by use of various known technologies to support wired or wireless communication of the electronic device 102 via the communication network 110. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3A:
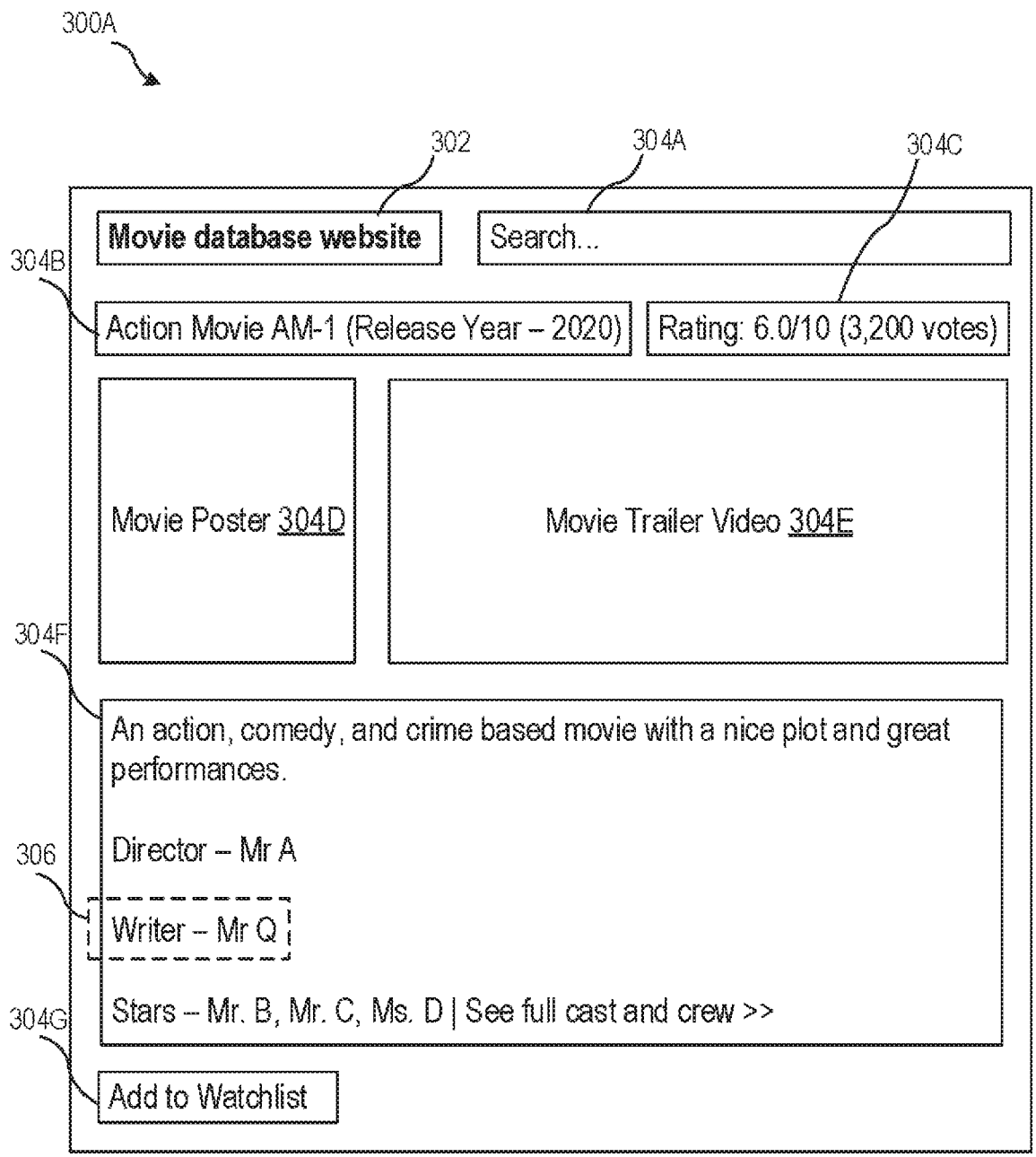
Figure 3C:
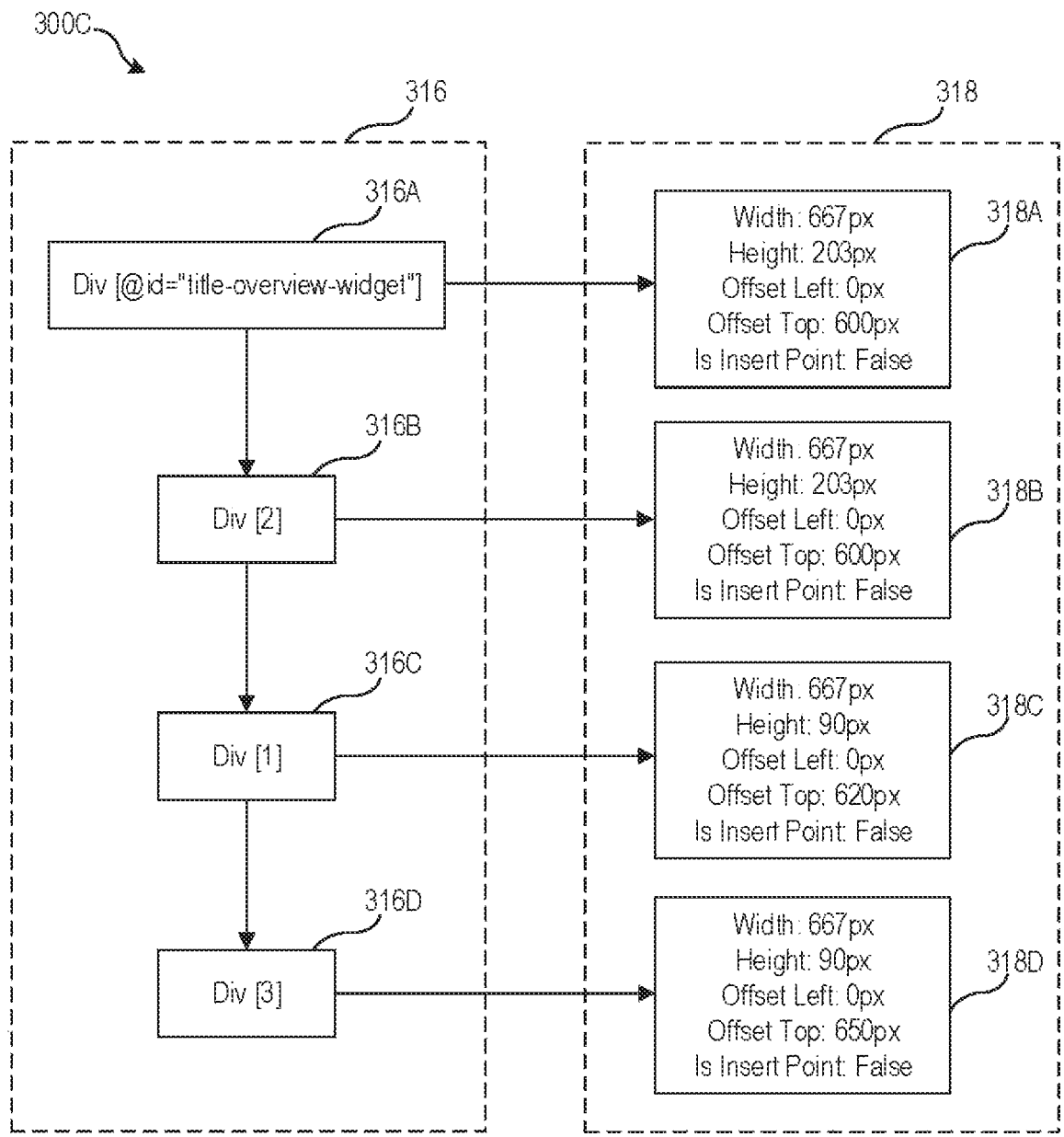

FIGS. 3A, 3B, and 3C, collectively illustrate, an example web page, exemplary tree data structure associated with presentation of items in the web page, and exemplary extraction rule for extraction of an item of the web page, respectively, arranged in accordance with at least one embodiment described in the present disclosure. FIGS. 3A, 3B, and 3C are explained in conjunction with elements from FIG. 1 and FIG. 2.

With reference to FIG. 3A, there is shown an example web page 300A. The example web page 300A may include a name of a web site (such as, "Movie database website" shown as 302 in FIG. 3A) associated with the web page 300A. The web page 300A may include a text box (such as, "Search" text box shown in 304A in FIG. 3A) to search web pages available on the web site 302. The web page 300A may further include a movie name and release year (such as, "Action Movie AM-1 (Release Year—2020)" shown in 304B in FIG. 3A) of a movie associated with the web page 300A. The web page may further include a rating and number of votes (such as, "Rating: 6.0/10 (3,200 votes)" shown in 304C in FIG. 3A) for the movie associated with the web page 300A. In addition, as shown in FIG. 3A, the web page 300A may include a movie poster (shown as 304D), a movie trailer video (shown as 304E), and a movie description (shown in 304F) of the movie of the web page 300A. The movie description (shown in 304F) may further include, but is not limited to, an overview of story of the movie, a name of a director of the movie, a name of a writer of the movie, and names of stars including full list of cast and crew of the movie. Further, the web page 300A may include a button (such as, an "Add to Watchlist" button, shown in 304G) to add the movie of the web page 300A to a playback queue or a watchlist of the user 114.

In some embodiments, a textual component of the web page 300A may be a potential item that may be extracted from the web page 300A for further processing and storage in a knowledge base or data repository, such as, the database 106. Examples of such textual components that may be potential items for extraction from the web page 300A may include, but are not limited to, the movie name and release year (shown as 304B), the movie rating and number of votes (shown as 304C), and the movie description (shown in 304F). The movie description may further include sub-components including the overview of story of the movie, the name of the director of the movie, the name of the writer of the movie, and the names of stars including full list of cast and crew of the movie. These sub-components may individually be the potential items for extraction from the web page 300A.

In an embodiment, the electronic device 102 may receive a user input, via the I/O device 210, to select one or more first items from the first web page 112A or the sample web page. For example, the electronic device 102 may receive the user input to select the name of the writer of the movie (as shown in 306 in FIG. 3A), from the web page 300A, as the first item selected from the first web page 112A or the sample web page. The electronic device 102 may be configured to label the selected one or more first items, such as the selected first item (e.g., the name of the writer of the movie, as shown in 306 in FIG. 3A). An example of a tree data structure associated with presentation of the items in the web page 300A is explained further, for example, in FIG. 3B.

With reference to FIG. 3B, there is shown an example tree data structure 300B that may be associated with the web page 300A and may be representative of presentation of items of the web page 300A. As shown in FIG. 3B, the tree data structure 300B may include a set of hierarchal elements or nodes associated with various items of the web page 300A. Each node may include visual properties, contextual information, and textual information associated with an item corresponding to the node.

As shown in FIG. 3B, the tree data structure 300B may be a document object model (DOM) tree of HTML content of the web page 300A in an eXtensible Markup Language (XML) format. Each item in the web page 300A may be represented by a node with a <div> tag in the DOM tree. For example, the DOM tree may include a first <div> node 308 with id as "title-overview widget", which may represent a group of items in the web page 300A below the movie poster 304D and the movie trailer video 304E. The first <div> node 308 may include a second <div> node 310A with a class "vital" and a third <div> node 310B with a class as "plot_summary_wrapper", which may encapsulate items in the movie description component 304F of the web page 300A. The DOM tree may further include a fourth <div> node 312 to define visual properties of the items in the movie description component 304F. For example, the fourth <div> node 312 may define the top margin and the bottom margin for the entire movie description component 304F as 10 pixels each. Further, the fourth <div> node 312 may include individual items or sub-components of the movie description component 304F. For example, as shown in FIG. 3B, the fourth <div> node 312 may include a fifth <div> node 314A for the overview of story of the movie, a sixth <div> node 314B for the name of the director of the movie, a seventh <div> node 314C for the name of the writer of the movie, and an eighth <div> node 314D for the names of stars including full list of cast and crew of the movie.

The electronic device 102 may be configured to determine a <div> node (corresponding to a labelled first item in the web page 300A) from the tree data structure 300B (i.e., a DOM tree). In an example, if the first item labelled by the electronic device 102 based on the received user input is the item "writer of the movie" (such as 306 in FIG. 3A), the electronic device 102 may determine the seventh <div> node 314C as the <div> node (i.e. a first node) corresponding to the labelled first item. The electronic device 102 may also determine a first path in the tree data structure 300B (i.e., a DOM tree) for the determined <div> node associated with the labeled first item. Further, the electronic device 102 may also determine first visual information associated with each node in the first path. The electronic device 102 may generate a first extraction rule to extract the first labelled item from the web page 300A, where the first extraction rule may include the first path and the first visual information associated with each node in the first path. The determination of the first path and the first visual information is explained further, for example, in FIG. 3C.

With reference to FIG. 3C, there is shown an example extraction rule 300C for extraction of an item of the web page 300A. The extraction rule 300C may correspond to the first extraction rule for extraction of the first labeled item from the web page 300A. The extraction rule 300C may include a first path 316 for the first node (i.e., the seventh <div> node 314C) for the first labeled item (i.e., the writer of the movie, as shown in 306 of FIG. 3A), in the first tree data structure (i.e., the tree data structure 300B or the DOM tree) of the web page 300A.

In the above example, the first path 316 for the seventh <div> node 314C may be represented by: Div[@id="title-overview-widget"]/Div[2]/Div[1]/Div[3], as shown from the tree data structure 300B and nodes 316A to 316D of FIG. 3C. The first path 316 may include the first <div> node 308 (i.e., a <div> node with id as "title-overview-widget", i.e., the node 316A), the third <div> node 310B (i.e., a <div> node at a second location at its level, i.e., the node 316B), the fourth <div> node 312 (i.e., a <div> node at a first location at its level, i.e., the node 316C), and finally the seventh <div> node 314C (i.e., a <div> node at a third location at its level, i.e., the node 316D), in same order.

The extraction rule 300C may further include first visual information 318 associated with each node in the first path 316. Though not shown in FIG. 3C, the extraction rule 300C may further include contextual information (such as, id, name, sibling texts, and so on) of nodes of the first path 316. For example, the electronic device 102 may determine visual properties 318A such as, a width of 667 pixels, a height of 203 pixels, a left offset of 0 pixels, a top offset of 600 pixels, and an insert point property of "false", as the first visual information associated with the node 316A of the first path 316. The electronic device 102 may similarly determine and included visual properties (318B to 318D shown in FIG. 3C) for each of the remaining nodes 316B to 316D of the first path 316 as the first visual information 318 as shown in FIG. 3C. The scope of the disclosure may not be limited to the visual properties enlisted above or shown in FIG. 3C. Examples of the visual properties associated with the first visual information 318 may include, but are not limited to, a font family, a font style, a font size, a font color, a background color, a left margin, a top margin, a right margin, a bottom margin, a transparency, a fill/highlight color, and a fill pattern.

It may be noted here that the web page 300A, the tree data structure 300B and the extraction rule 300C shown in FIGS.

3A-3C are presented merely as examples, and should not be construed to limit the scope of the disclosure.

Figure 4A:
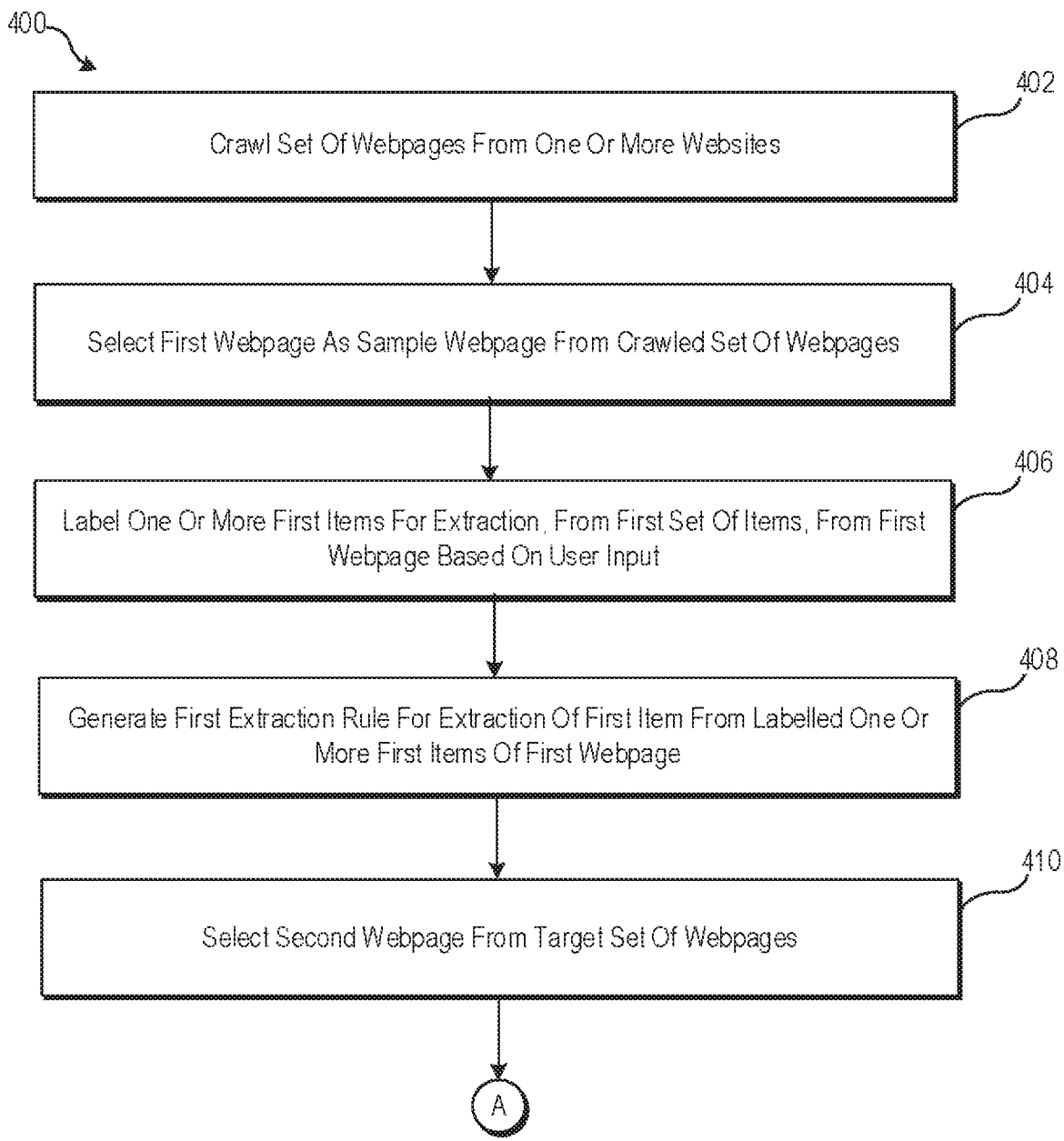
FIGS. 4A and 4B, collectively, illustrate a flowchart of an example method for information extraction from web pages.
Figure 4B:
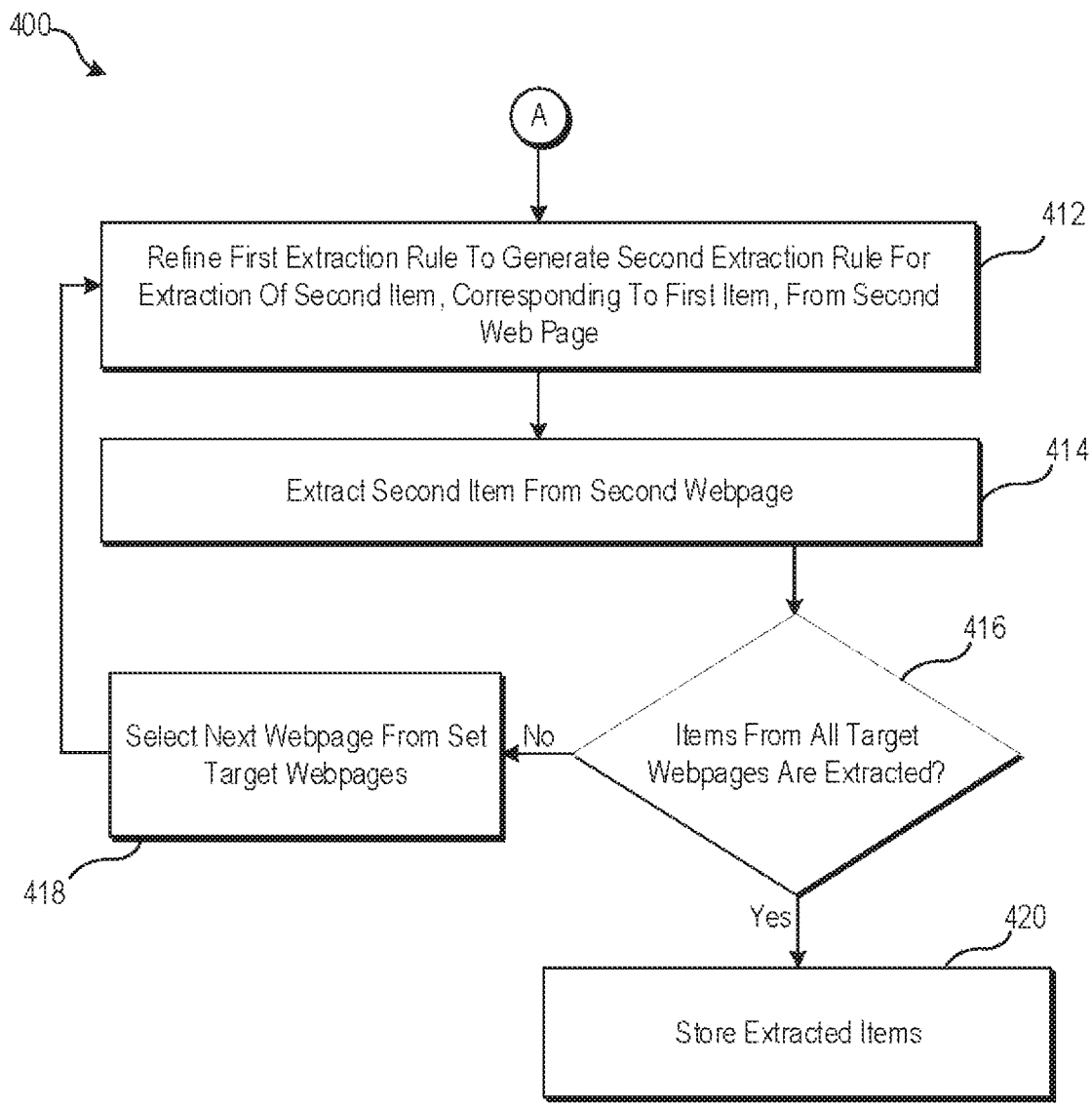

FIGS. 4A and 4B, collectively, illustrate a flowchart of an example method for information extraction from web pages, arranged in accordance with at least one embodiment described in the present disclosure. FIGS. 4A and 4B are explained in conjunction with elements from FIG. 1, FIG. 2, FIG. 3A, FIG. 3B, and FIG. 3C. With reference to FIGS. 4A and 4B, there is shown a flowchart 400. The method illustrated in the flowchart 400 may start at 402 and may be performed by any suitable system, apparatus, or device, such as by the example electronic device 102 of FIG. 1 or FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, the set of web pages 112 may be crawled from one or more web sites. In an embodiment, the processor 204 may be configured to crawl the set of web pages 112 from the one or more web sites hosted on the server 104 and store the crawled set of web pages 112 on the database 106 or in the memory 206. In an embodiment, the processor 204 may use a headless browser to crawl the set of web pages 112. For example, the processor 204 may use a Puppeteer add-in of Chrome browser as a browser in a headless mode to crawl the set of web pages 112. Other examples of web crawlers that the processor 204 may use to crawl the set of web pages 112 may include, but are not limited to, Frontera, GRUB, Heritrix, Apache Nutch, PHP-Crawler, Scrapy, Seeks, StormCrawler, tKWWWRobot, Xapian, and Open Search Server. In an embodiment, the one or more web sites may belong to a same category. Examples of the category may include, but are not limited to, a movie, music, ticket booking, shopping, e-commerce, grocery, medical, tourism, news, banking, educational, travel, social media, property, or search engines.

In an embodiment, to crawl the set of web pages 112, the processor 204 may extract or fetch hypertext (e.g., HTML) content of each web page in the set of web pages 112 and check whether each web page is a dynamic page. The processor 204 may check whether a web page is dynamic based on the extracted hypertext content. For example, the processor 204 may determine that a web page is dynamic based on a determination that whether the HTML content of the web page includes an active client side script (e.g., Java script) in one or more nodes (e.g., <div> nodes) of related tree data structure (e.g., DOM tree) or not, where the script may request for updated information from the server 104 at the time of loading of the web page. For each dynamic web page in the set of web pages 112, the processor 204 may intercept a communication between the web page and the server 104 associated with the one or more web sites. For example, the processor 204 may intercept the communication including XMLHttpRequest (XHR) request and response messages, between a dynamic page in the crawled set of web pages 112 and the server 104 that may host the one or more web sites. In an example, with reference to FIGS. 3A and 3B, for the web page 300A with the tree data structure 300B, the processor 204 may intercept an XHR response at a time, say, 02/16/2020 19:58:11.120. The XHR response may include information in JavaScript Object Notation object (JSON) format, such as, {Director="Mr. A", Writer="Mr. Q" . . . }, which may correspond to the items in the movie description component 304F.

To crawl the set of web pages 112, the processor 204 may be further configured to identify an updated node in a tree data structure of each dynamic web page in the crawled set of web pages 112, based on the interception of the communication. For example, the processor 204 may record DOM tree nodes that may be updated by XHR response messages in each dynamic page in the crawled set of web pages 112. For example, the processor 204 may use a MutationObserver object in the Puppeteer add-in of Chrome to determine a DOM tree node or an XPath of the node updated by an XHR request message. In an example, with reference to FIGS. 3A and 3B, for the web page 300A with the tree data structure 300B, the processor 204 may determine that the XHR request may update the node given by the XPath div[@id="title-overview-widget"]/div[2] or the third <div> node 310B at a time, say for example 02/16/2020 19:58:11.100.

At block 404, a first web page (such as the first web page 112A) or a sample web page may be selected from the crawled set of web pages 112. In an embodiment, the processor 204 may be configured to select the first web page 112A as the sample web page from the crawled set of web pages 112. The processor 204 may either select the first web page 112A randomly or based on the user input received from the user 114.

At block 406, one or more first items from a first set of items of the first web page 112A may be labelled for extraction based on a user input. In an embodiment, the processor 204 may be configured to label the one or more first items for extraction, from the first set of items of the first web page 112A based on reception of the user input from the user 114, where the user input may be an indicative of selection of the one or more first items for labelling. The processor 204 may label the one or more first items selected by the user 114 as described, for example, in FIG. 3A. The labelling of the one or more first items of the first web page 112A is explained further, for example, in FIGS. 5 and 6.

At block 408, a first extraction rule for an extraction of a first item from the labelled one or more first items of the first web page 112A may be generated. In an embodiment, the processor 204 may be configured to generate an initial extraction rule or the first extraction rule for the extraction of the labelled first item from the labelled one or more first items of the first web page 112A. The first extraction rule may include a first path (e.g., an XPath) in a first tree data structure (e.g., a DOM tree), for a first node (e.g., a <div> node) associated with the labelled first item, and may further include first visual information (e.g., visual properties) associated with each node in the first path (such as the first path 316). The first extraction rule may further include contextual information (such as, id, name, sibling texts, and so on) of nodes of the first path 316. The generation of the first extraction rule for the extraction of the labelled first item from the labelled one or more first items of the first web page 112A is described further, for example, in FIG. 7.

At block 410, a second web page 112B may be selected from the set of target web pages in the crawled set of web pages 112. In an embodiment, the processor 204 may be configured to select the second web page 112B from the set of target web pages in the crawled set of web pages 112.

At block 412, the first extraction rule may be refined to generate a second extraction rule for extraction of a second item of the second web page 112B. In an embodiment, the processor 204 may be configured to refine the first extraction rule to generate the second extraction rule for extraction of the second item of the second web page 112B. The second item may correspond to the first item. To generate the second rule, the processor 204 may be configured to compare the first visual information associated with each node in the first path 316 with second visual information associated with each of a plurality of candidate nodes in a second tree data structure associated with the selected second web page 112B. The processor 204 may then select a second node from the plurality of candidate nodes in the second tree data structure based on the comparison. The selected second node may correspond to the first item. The processor 204 may generate the second extraction rule based on the selected second node. The second extraction rule may include a second path for the selected second node in the second tree data structure and may further include the second visual information for each node in the second path. The refinement of the first extraction rule to generate the second extraction rule is described further, for example, in FIGS. 8A, 8B, 8C, 9, 10, and 11.

At block 414, the second item may be extracted from the second web page 112B. In an embodiment, the processor 204 may be configured to extract the second item from the second web page 112B based on the second extraction rule for extraction of the second item. For example, the processor 204 may use the second path to retrieve the second node from the second tree data structure. In case the second web page 112B is a dynamic web page, the processor 204 may extract an attribute-value pair associated with an XHR JSON wrapper, which may be further associated with the second item. The processor 204 may further check whether the second node corresponds to the extracted attribute-value pair. If the second node corresponds to the extracted attribute-value pair, the processor 204 may extract the value of the attribute-value pair as the value of the second item of the second web page 112B. If the second web page 112B is not a dynamic web page, the processor 204 may select the second node, corresponding to the second item, from the plurality of candidate nodes in the second tree data structure. The processor 204 may be further configured to detect and extract the second item of the second web page 112B as further described, for example, in FIG. 8C (step 826).

At block 416, a check may be performed to determine whether one or more items, corresponding to the labelled one or more first items, are extracted from each of the set of target web pages. In an embodiment, the processor 204 may be configured to perform the check to determine whether the one or more items, corresponding to the labelled one or more first items, are extracted from each of the set of target web pages. If it is determined that all web pages from the set of target web pages are processed and the one or more items are extracted from each of the set of target web pages, control may pass to step 420. Otherwise, control may pass to step 418.

At block 418, a next web page may be selected from the set of target web pages. In an embodiment, the processor 204 may select a next web page from the set of web pages 112, for the further refinement of the first extraction rule, and extraction of an item, corresponding to the labelled first item, from the next web page. Control may pass to step 412.

At block 420, each of the one or more extracted items from the set of target web pages 112 may be stored. In an embodiment, the processor 204 may be configured to store each of the one or more extracted items from the set of target web pages 112 in a knowledge base or a repository, such as, the database 106, the memory 206, the persistent data storage 208, or a combination thereof. Control may pass to end.

Although the flowchart 400 is illustrated as discrete operations, such as 402, 404, 406, 408, 410, 412, 414, 416, 418, and 420. However, in certain embodiments, such discrete operations may be further divided into additional operations, combined into fewer operations, or eliminated, depending on the particular implementation without detracting from the essence of the disclosed embodiments.

Figure 5:
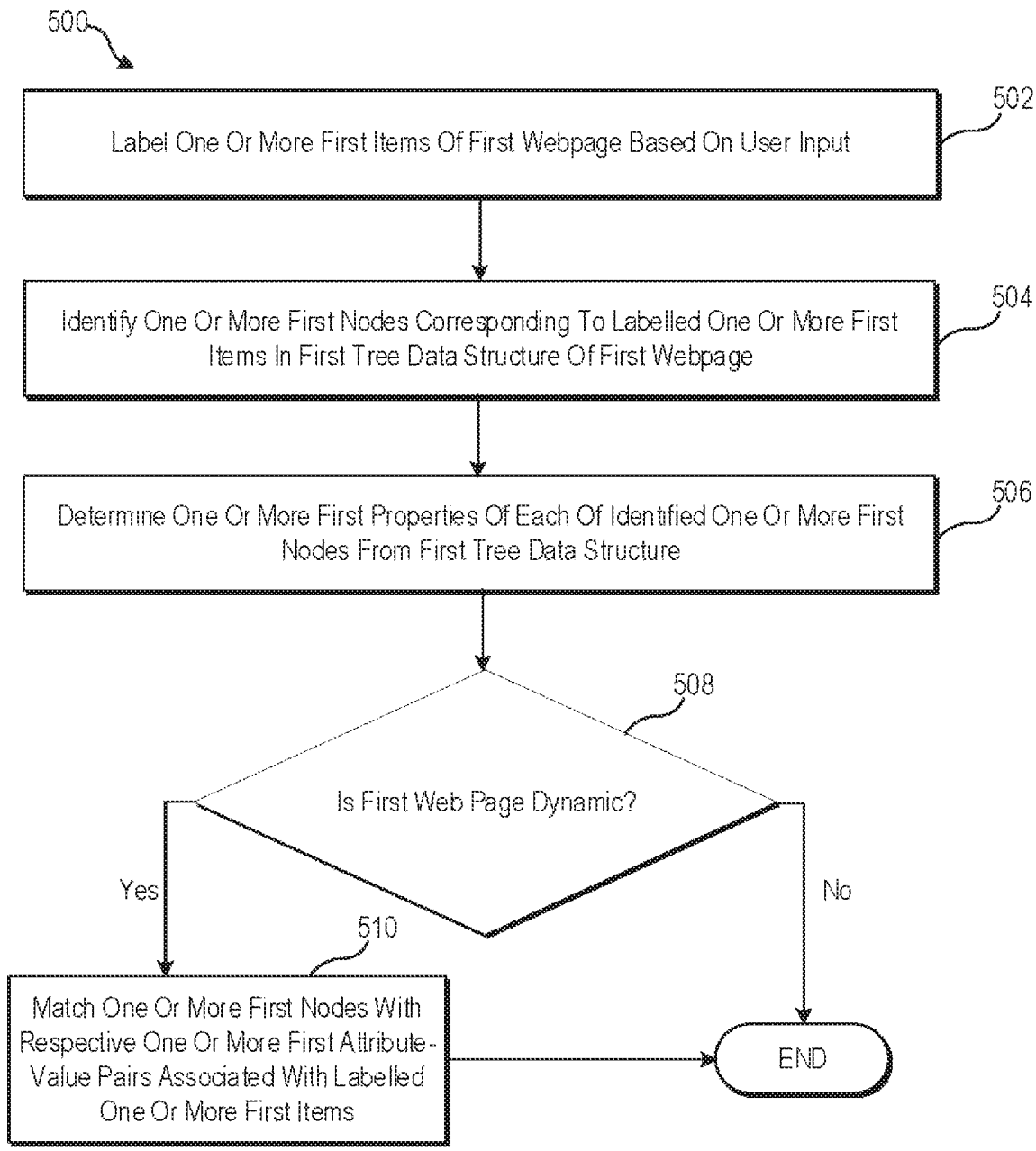
FIG. 5 is a flowchart of an example method for labeling of one or more first items of a first web page.

FIG. 5 is a flowchart of an example method for labeling of one or more first items of a first web page, arranged in accordance with at least one embodiment described in the present disclosure. FIG. 5 is explained in conjunction with elements from FIG. 1, FIG. 2, FIG. 3A, FIG. 3B, FIG. 3C, FIG. 4A and FIG. 4B. With reference to FIG. 5, there is shown a flowchart 500. The method illustrated in the flowchart 500 may start at 502 and may be performed by any suitable system, apparatus, or device, such as by the example electronic device 102 of FIG. 1 or FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, the one or more first items of the first web page 112A may be labelled based on a user input. In an embodiment, the processor 204 may be configured to label the one or more first items from the first set of items in the first web page 112A based on the user input received from the user 114. In an embodiment, the electronic device 102 may present an annotation tool on the display screen 212 of the electronic device 102 for the user 114 to select the one or more first items from the first web page 112A. For example, the electronic device 102 may present a graphical user interface (GUI), associated with the first web page 112A, on the display screen 212 with two usage modes. In a first usage mode of the GUI, the electronic device 102 may enable the user 114 to perform regular tasks with associated with the first web page 112A, such as scrolling, viewing, and providing input to various data entry fields in the first web page 112A. In a second usage mode of the GUI, the electronic device 102 may enable the user 114 to perform selection of various items of the first web page 112A for extraction of the items from the first web page 112A, and extraction of corresponding items from target web pages in the crawled set of web pages 112.

In an embodiment, the processor 204 may be configured to label the selected one or more first items for extraction from the first web page 112A. In an example, with reference to FIG. 3A, the electronic device 102 may receive a user input from the user 114 for a selection of a first item, such as, the "Writer" (as shown in 306 in FIG. 3A) from the web page 300A of FIG. 3A. The processor 204 may label the first item "Writer" of the web page 300A based on such received user input from the user 114. In an embodiment, the processor 204 may store the labeled one or more first items (e.g., the first item, such as, "Writer") in the database 106, the memory 206, or the persistent data storage 208.

In an embodiment, each of the labelled one or more first item may correspond to one of prefix text information or suffix element information. For example, the processor 204 may receive a user input indicating a selection of a name "Mr. Q" (as shown in 306 of FIG. 3A) for selection of a prefix text, such as, "Writer" (as shown in 306 of FIG. 3A). In such case, the string "Writer" may correspond to the prefix text information that may be labelled as the first item based on the selection of the name "Mr. Q" by the user 114. In another example, the processor 204 may receive a user input indicating selection of an element "Director—Mr. A" (as shown in 304F) for selection of a text (for example, "Writer", as shown in 306 of FIG. 3A) that may be a suffix of the selected element. Again, in such scenario, the string "Writer" may correspond to the suffix element information that may be labelled as the first item based on the selection of the element "Director—Mr. A" (i.e., a sub-component of the component 306 in FIG. 3A).

At block 504, one or more first nodes, corresponding to the labelled one or more first items, may be identified in the first tree data structure of the first web page 112A. In an embodiment, the processor 204 may be configured to identify the one or more first nodes in the first tree data structure, that correspond to the labelled one or more first items. In an embodiment, the processor 204 may use the annotation tool to automatically identify the one or mode first nodes, corresponding to the labelled one or more first items, in the first tree data structure. In an example, the annotation tool may be a browser add-in or an API associated with the browser add-in (such as, Puppeteer add-in of a Chrome browser). For example, with reference to FIGS. 3A and 3B, for the labeled first item "Writer", the processor 204 may identify the seventh <div> node 314C as a first node corresponding to the labelled first item, in the tree data structure 300B of the web page 300A.

At block 506, one or more first properties of each of the identified one or more first nodes may be determined from the first tree data structure. In an embodiment, the processor 204 may be configured to determine the one or more first properties of each of the one or more first nodes from the first tree data structure. In an embodiment, the one or more first properties may include one or more first visual properties and one or more first contextual constraints associated with the one or more first nodes. The first visual information may correspond to the one or more first properties for the first node included in the one or more first nodes. In an example, the processor 204 may use predefined JavaScript methods to extract the one or more first properties of the one or more first nodes. Examples of the one or more first visual properties associated with the first visual information may include, but are not limited to, a font family, a font style, a font size, a font color, a background color, a left margin, a top margin, a right margin, a bottom margin, a transparency, a fill/highlight color, and a fill pattern. Examples of the one or more first contextual constraints may include, but are not limited to, id, name, and sibling texts.

At block 508, it may be determined whether the first web page 112A is dynamic page or not. In an embodiment, the processor 204 may be configured to determine whether the first web page 112A is dynamic or not, as described, for example, at block 402 in FIG. 4A Control may pass to step 510 in case the first web page 112A is determined to be a dynamic web page. Otherwise, control may pass to end.

At block 510, the one or more first nodes may be matched with respective one or more first attribute-value pairs associated with the labelled one or more first items. In an embodiment, the processor 204 may be configured to match the one or more first nodes with the respective one or more first attribute-value pairs associated with the labelled one or more first items. In an embodiment, the processor 204 may be configured to intercept a communication between the first web page 112A and the server 104 associated with the one or more web sites. For example, the processor 204 may intercept an XHR response message (associated with the one or more first items corresponding to the one or more first nodes) that may be received by the electronic device 102 from the server 104. The XHR response may be in JSON format and may include the one or more first attribute-value pairs corresponding to the one or more first nodes. The processor 204 may retrieve the one or more first attribute-value pairs from the intercepted XHR response. The matching of the one or more first nodes with the respective one or more first attribute-value pairs associated with the labelled one or more first items is described further, for example, in FIG. 6. Control may pass to end.

Although the flowchart 500 is illustrated as discrete operations, such as 502, 504, 506, 508, and 510. However, in certain embodiments, such discrete operations may be further divided into additional operations, combined into fewer operations, or eliminated, depending on the particular implementation without detracting from the essence of the disclosed embodiments.

Figure 6:
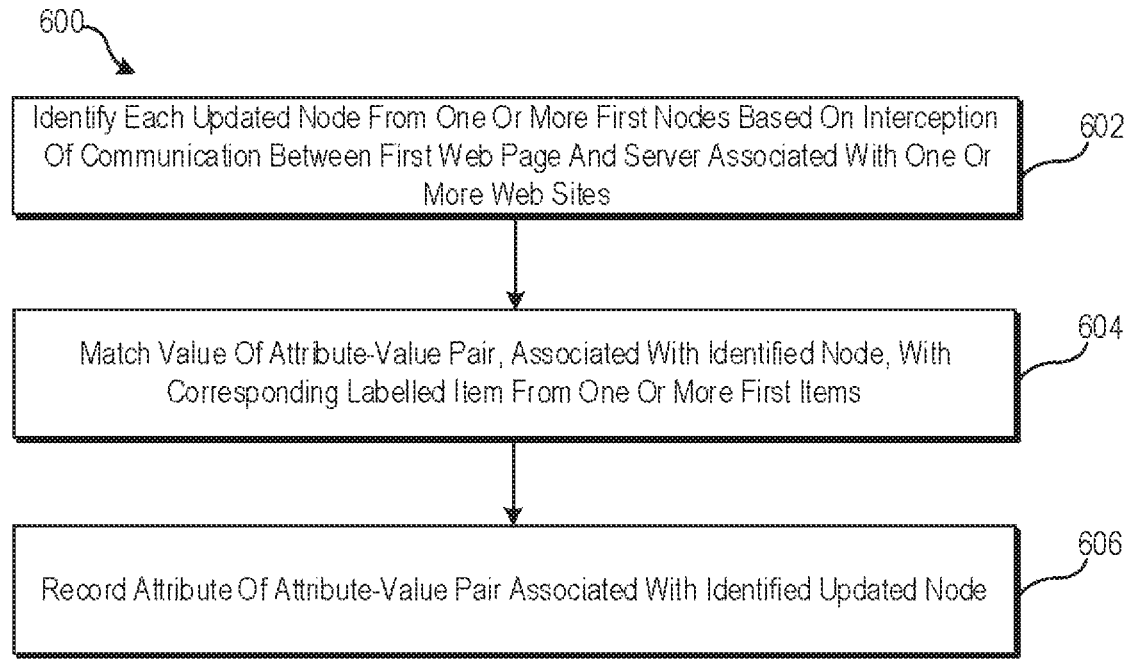
FIG. 6 is a flowchart of an example method for matching one or more first nodes of first tree data structure of first web page with one or more first attribute value pairs.

FIG. 6 is a flowchart of an example method for matching one or more first nodes of first tree data structure of a first web page with one or more first attribute value pairs, arranged in accordance with at least one embodiment described in the present disclosure. FIG. 6 is explained in conjunction with elements from FIG. 1, FIG. 2, FIG. 3A, FIG. 3B, FIG. 3C, FIG. 4A, FIG. 4B, and FIG. 5. With reference to FIG. 6, there is shown a flowchart 600. The method illustrated in the flowchart 600 may start at 602 and may be performed by any suitable system, apparatus, or device, such as by the example electronic device 102 of FIG. 1 or FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, each updated node from the one or more first nodes may be identified based on the interception of the communication between the first web page 112A and the server 104 associated with the one or more web sites. In an embodiment, the processor 204 may be configured to identify each updated node from the one or more first nodes corresponding to the labelled one or more first items. In an embodiment, the processor 204 may be configured to intercept the communication between the first web page 112A and the server 104 associated with the one or more web sites. For example, the processor 204 may intercept XHR request messages associated with the one or more first items (corresponding to the one or more first nodes) that may be transmitted by the electronic device 102 to the server 104. Based on the intercepted XHR request messages, the processor 204 may locate nodes in the first tree data structure (i.e., the DOM tree) of the first web page 112A. For example, with reference to FIG. 3B, the processor 204 may intercept an XHR request message from a script (e.g., JavaScript) associated with the third <div> node 310B at a path div [@id="title-overview-widget"]/div[2] in the tree data structure 300B of the web page 300A. In such case, the processor 204 may locate the third <div> node 310B as the source of the XHR request message, say, at a time 02/16/2020 19:58:11.100.

In an embodiment, the processor 204 may be configured to identify each node updated by the XHR request message, which may be overlapped with the one or more first nodes corresponding to the labelled one or more first items. For example, in the above case (refer FIG. 3B), the processor 204 may determine that the seventh <div> node 314C at a path Div[@id="title-overview-widget"]/Div[2]/Div[1]/Div[3] in the tree data structure 300B of the web page 300A may be an updated node that is also a labeled item (i.e., the labeled first item) as per the received user input. In above example, the processor 204 may identify the seventh <div> node 314C as the updated node.

In an embodiment, the identification of each updated node by the processor 204 may be further based on a timestamp associated with the intercepted communication between the first web page 112A and the server 104 associated with the one or more web sites. For example, the processor 204 may intercept XHR response messages (associated with the one or more first items) that may be received by the electronic device 102 from the server 104. Based on a timestamp of each intercepted XHR response message, the processor 204 may locate nodes in the first tree data structure (i.e., the DOM tree) of the first web page 112A. For example, with reference to FIG. 3B, the processor 204 may intercept two XHR response messages for a script associated with the third <div> node 310B at a path div[@id="title-overview-widget"]/div[2] in the tree data structure 300B of the web page 300A. In such case, the processor may determine a timestamp associated with each XHR response message and map attribute-value pairs in the XHR response with a later time stamp value, for the located updated node (e.g., the third <div> node 310B).

At block 604, a value of an attribute-value pair associated with the identified updated node may be matched with a corresponding labelled item from the labelled one or more first items. In an embodiment, the processor 204 may be configured to match the value of the attribute-value pair associated with the identified updated node with a corresponding labelled item from the labelled one or more first items. For example, with reference to FIGS. 3A and 3B, the seventh <div> node 314C may correspond to the first labelled item "Writer" (as shown 306 in FIG. 3A). The processor 204 may intercept an XHR response message associated with the seventh <div> node 314C, received by the first web page 112A from the server 104. The XHR response message may include a JSON key-value pair, which may correspond to the attribute-value pair associated with the seventh <div> node 314C. The processor 204 may match the value (e.g., "Mr. Q") in the attribute-value pair (e.g., Writer: "Mr. Q") to the identified seventh <div> node 314C.

At block 606, the attribute of the attribute-value pair associated with the identified updated node may be recorded. In an embodiment, the processor 204 may be configured to record the attribute of the attribute-value pair associated with the identified updated node. In an embodiment, the processor 204 may record the attribute by storing the attribute in the database 106, the memory 206, the persistent data storage 208, or a combination thereof. For example, for an attribute-value pair Writer: "Mr. Q", the processor 204 may record the attribute 'Writer' in the database 106. Control may pass to end.

Although the flowchart 600 is illustrated as discrete operations, such as 602, 604, and 606. However, in certain embodiments, such discrete operations may be further divided into additional operations, combined into fewer operations, or eliminated, depending on the particular implementation without detracting from the essence of the disclosed embodiments.

Figure 7:
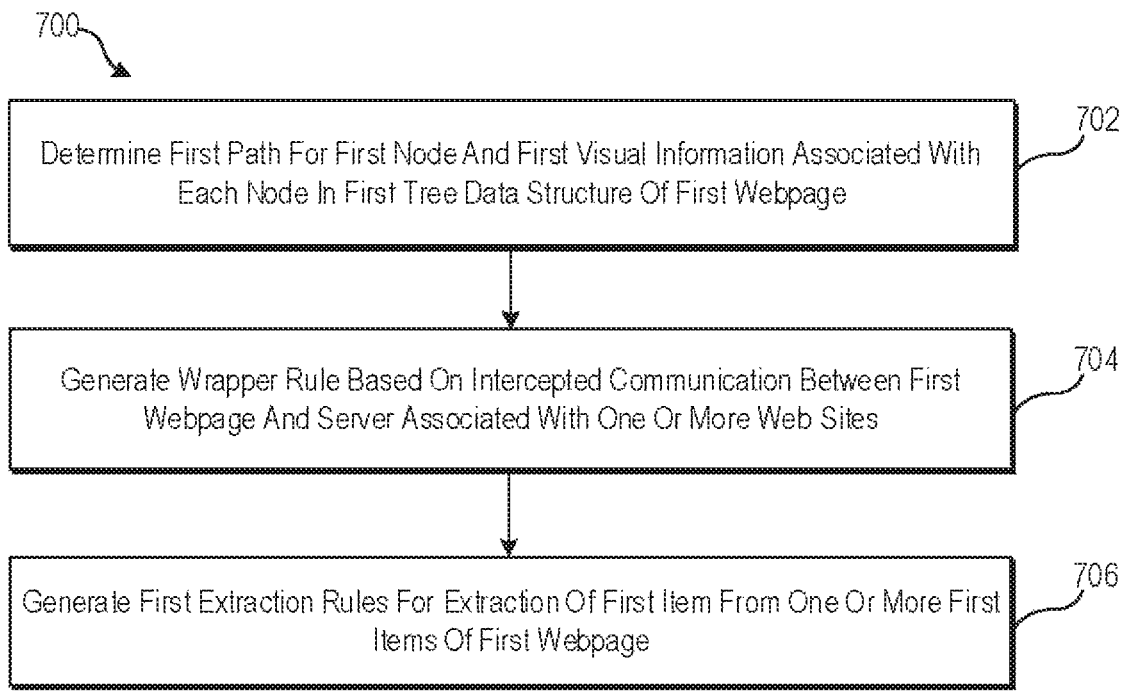
FIG. 7 is a flowchart of an example method for generating a first extraction rule for extraction of a first labeled item of a first web page.

FIG. 7 is a flowchart of an example method for generating a first extraction rule for extraction of a first labeled item of a first web page, arranged in accordance with at least one embodiment described in the present disclosure. FIG. 7 is explained in conjunction with elements from FIG. 1, FIG. 2, FIG. 3A, FIG. 3B, FIG. 3C, FIG. 4A, FIG. 4B, FIG. 5, and FIG. 6. With reference to FIG. 7, there is shown a flowchart 700. The method illustrated in the flowchart 700 may start at 702 and may be performed by any suitable system, apparatus, or device, such as by the example electronic device 102 of FIG. 1 or FIG. 2. Although illustrated with discrete blocks, the steps and operations associated with one or more of the blocks of the flowchart 400 may be divided into additional blocks, combined into fewer blocks, or eliminated, depending on the particular implementation.

At block 702, in the first tree data structure, the first path 316 for the first node and the first visual information associated with each node in the first path 316 may be determined. In an embodiment, the processor 204 may be configured to determine the first path 316, in the first tree data structure, for the first node corresponding to the first item of the first web page 112A. The processor 204 may also be configured to determine the first visual information associated with each node in the first path 316. In an example, with reference to FIGS. 3A to 3C, the item "Writer" (as shown in FIG. 3A) may be labelled as the first item in the web page 300A. The processor 204 may determine the first node corresponding to the first item "Writer" in the tree data structure 300B of the web page 300A as the seventh <div> node 314C. Further, the processor 204 may determine the first path 316 as the XPath of the seventh <div> node 314C in the tree data structure 300B as Div [@id="title-overview-widget"]/Div[2]/Div[1]/Div[3], as shown in the tree data structure 300B in FIGS. 3B and 3C. In an embodiment, the processor 204 may be further configured to determine visual properties associated with each node in the XPath of the first node corresponding to the first item. In certain scenarios, the visual properties of a node in the XPath may be included as attributes associated with the node. In another scenario, the processor 204 may use methods provided by an API of the browser or client-side scripts to determine the visual properties of a node in the XPath. For example, the processor 204 may use a GetComputedStyle( ) JavaScript method to determine the visual properties of a node in the XPath. Examples of the visual properties associated with the first visual information may include, but are not limited to, a font family, a font style, a font size, a font color, a background color, a left margin, a top margin, a right margin, a bottom margin, a transparency, a fill/highlight color, and a fill pattern.

At block 704, a wrapper rule may be generated based on the intercepted communication between the first web page 112A and the server 104 associated with the one or more web sites. In an embodiment, the processor 204 may be configured to generate the wrapper rule based on the communication intercepted between the first web page 112A and the server 104 associated with the one or more web sites. In an example, the wrapper rule may correspond to a JSON wrapper rule. The JSON wrapper rule may include a Uniform Resource Locator (URL) of data requested by the XHR request corresponding to the intercepted communication associated with the first web page 112A, and a list of information on each item (e.g., the one or more first items) to be extracted from the first web page 112A. The list of information may include a key in the JSON result of the XHR response (e.g., a key such as "Writer" for the first item 306 as shown in FIG. 3A) and a successful counter, which may be set as "1" for the first extraction rule. In some cases, the labelled item value may be found in multiple JSON results. The processor 204 may use voting to resolve multiple JSON results with the same value. An example of the JSON wrapper rule may be represented as under:

{
URL: http://example.com.data,
[
  {
  Writer: name1,
  Successful counter: 1
  },
  {

Director: name2,
        Successful counter: 1
    },
    . . .
    ]
}

It may be noted that the JSON wrapper rule is presented merely as an exemplary wrapper rule, and the scope of the disclosure may not be so limited. The disclosure may be implemented based on wrapper rules of other formats.

At block 706, the first extraction rule for extraction of the first item from one or more first items of the first web page 112A may be generated. In an embodiment, the processor 204 may be configured to generate the first extraction rule for the extraction of the first item of the first web page 112A. In an embodiment, the first extraction rule may include a rule ID and a list of item extraction rules that may include an item name of the first item, such as, "Writer", an ID pointing to the first path 316 (e.g., the XPath of the first node in the first tree data structure) along with the first visual information associated with each node in the first path 316, and an ID pointing to the wrapper rule (e.g., a JSON wrapper rule). Control may pass to end.

Although the flowchart 700 is illustrated as discrete operations, such as 702, 704, and 706. However, in certain embodiments, such discrete operations may be further divided into additional operations, combined into fewer operations, or eliminated, depending on the particular implementation without detracting from the essence of the disclosed embodiments.

Figure 8A:
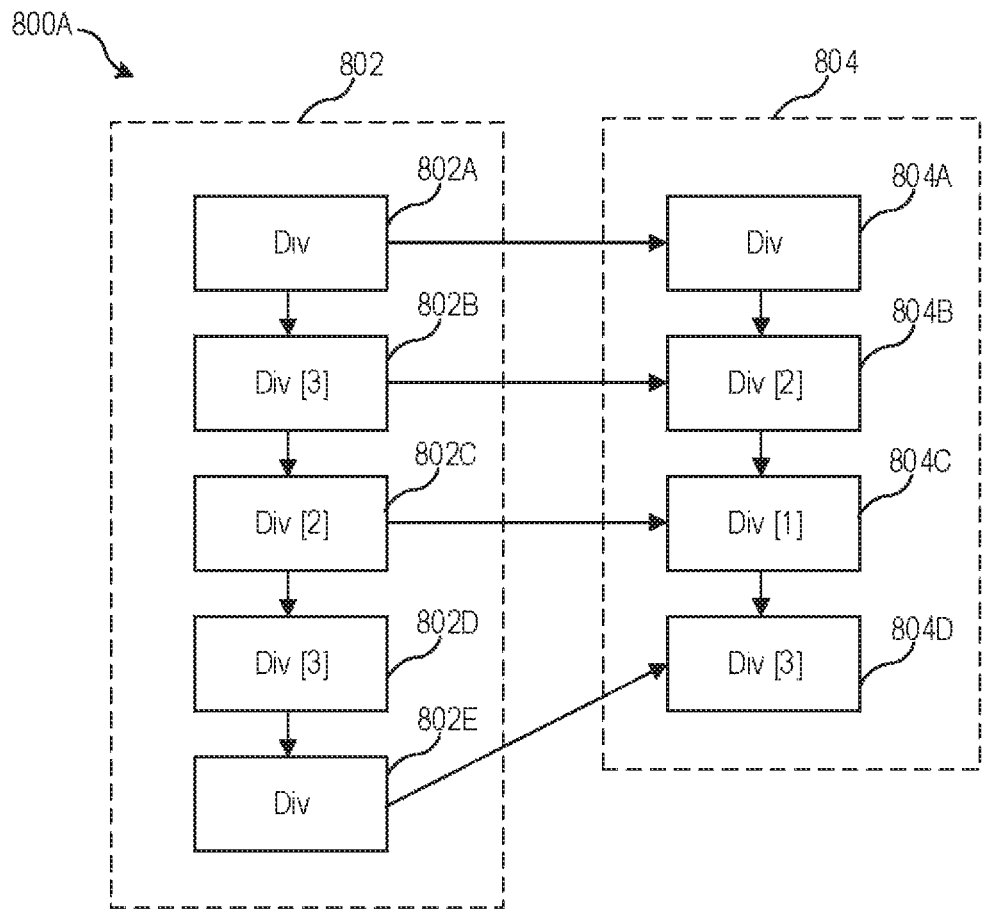
FIG. 8A is a diagram that illustrates an exemplary scenario of a second path for a second node in a second tree data structure of a second web page.

FIG. 8A is a diagram that illustrates an exemplary scenario of a second path for a second node in a second tree data structure of a second web page, arranged in accordance with at least one embodiment described in the present disclosure. FIG. 8A is explained in conjunction with elements from FIG. 1, FIG. 2, FIG. 3A, FIG. 3B, FIG. 3C, FIG. 4A, FIG. 4B, FIG. 5, FIG. 6, and FIG. 7 With reference to FIG. 8A, there is shown an exemplary scenario 800A. As shown in FIG. 8A, the exemplary scenario 800A may include a second path 802 and a first path 804 (i.e. similar to the first path 316 of FIG. 3A).

As shown in FIG. 8A, the second path 802 may be an XPath "Div/Div[3]/Div[2]/Div[3]/Div[1]" in the second tree data structure (e.g., a DOM tree) of the second web page 112B. Further, as shown in FIG. 8A, the first path 804 may be an XPath "Div/Div[2]/Div[1]/Div[3]" in the first tree data structure (e.g., a DOM tree) of the first web page 112A. The second path 802 may include a node 802A, a node 802B, a node 802C, a node 802D, and a node 802E. The first path 804 may include a node 804A, a node 804B, a node 804C, and a node 804D. In an embodiment, the node 802E may be the second node that may correspond to the second path 802 in the second tree data structure. Further, the node 802E, (i.e., the second node) may correspond to the second item in the second web page 112B. The second item may correspond to or similar to the first item of the first web page 112A. In some embodiments, the node 804D (i.e., the first node) in the first path 804 may correspond to the first item of the first web page 112A. The refinement of the first extraction rule and the generation of the second extraction rule for the extraction of the second item of the one or more second items of the second web page 112B are described further, for example, in FIGS. 8B and 8C.

In an example, as shown in FIG. 8A, the node 804D (i.e., the first node) may be located at a fourth level in the first path 804 in the first tree data structure associated with the first web page 112A. However, the node 802E (i.e., the second node) may be located at a fifth level in the second path 802 in the second tree data structure associated with the second web page 112B. Thus, the first item and the second item (which may correspond or similar to the first item) may be located at different positions in the first web page 112A and the second web page 112B, respectively.

It may be noted here that the second path 802 and the first path 804 shown in FIG. 8A are merely presented as example and should not be construed to limit the scope of the disclosure.

Figure 8B:
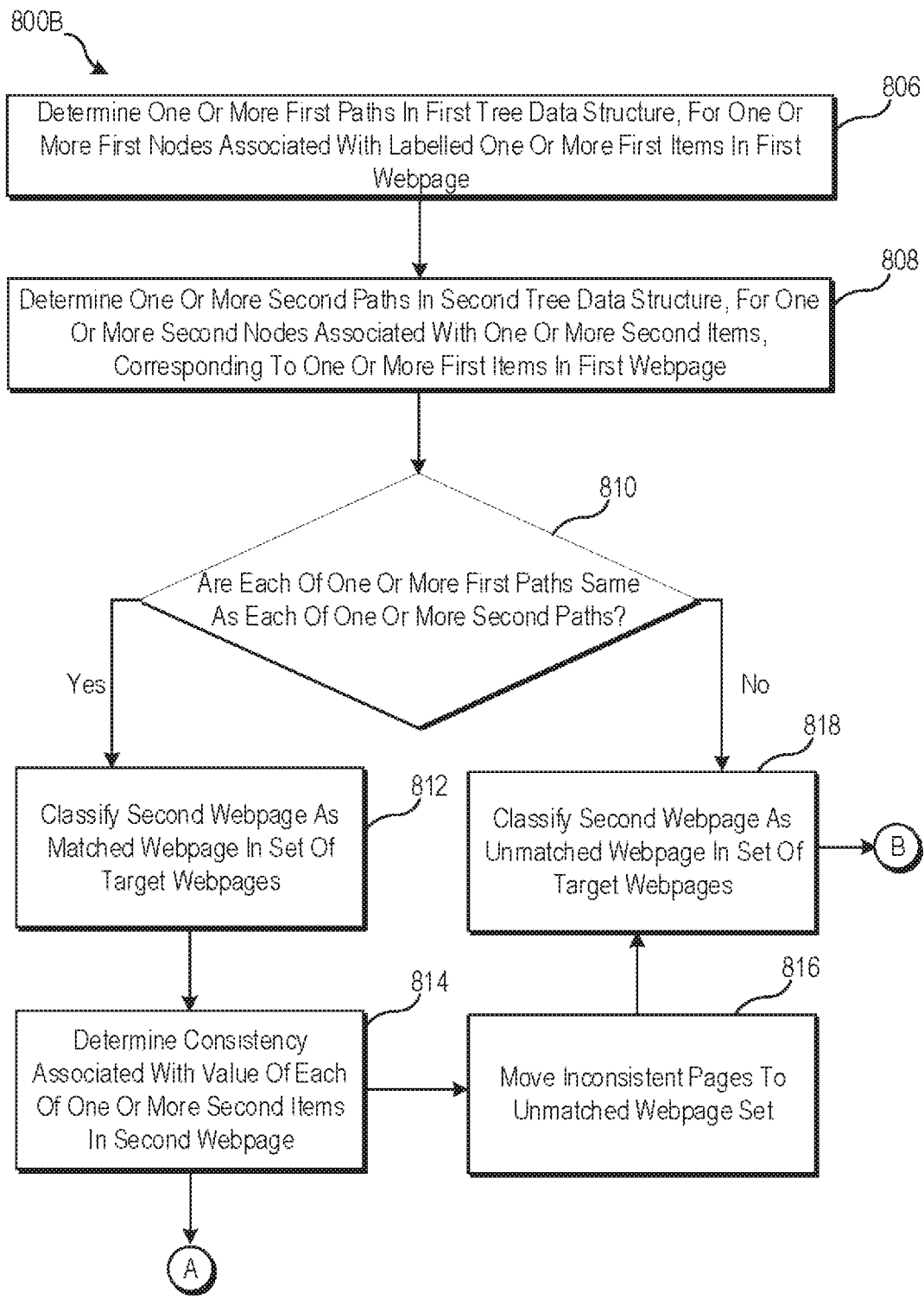
FIGS. 8B and 8C, collectively, illustrate a flowchart of an example method for refining a first extraction rule.
Figure 8C:
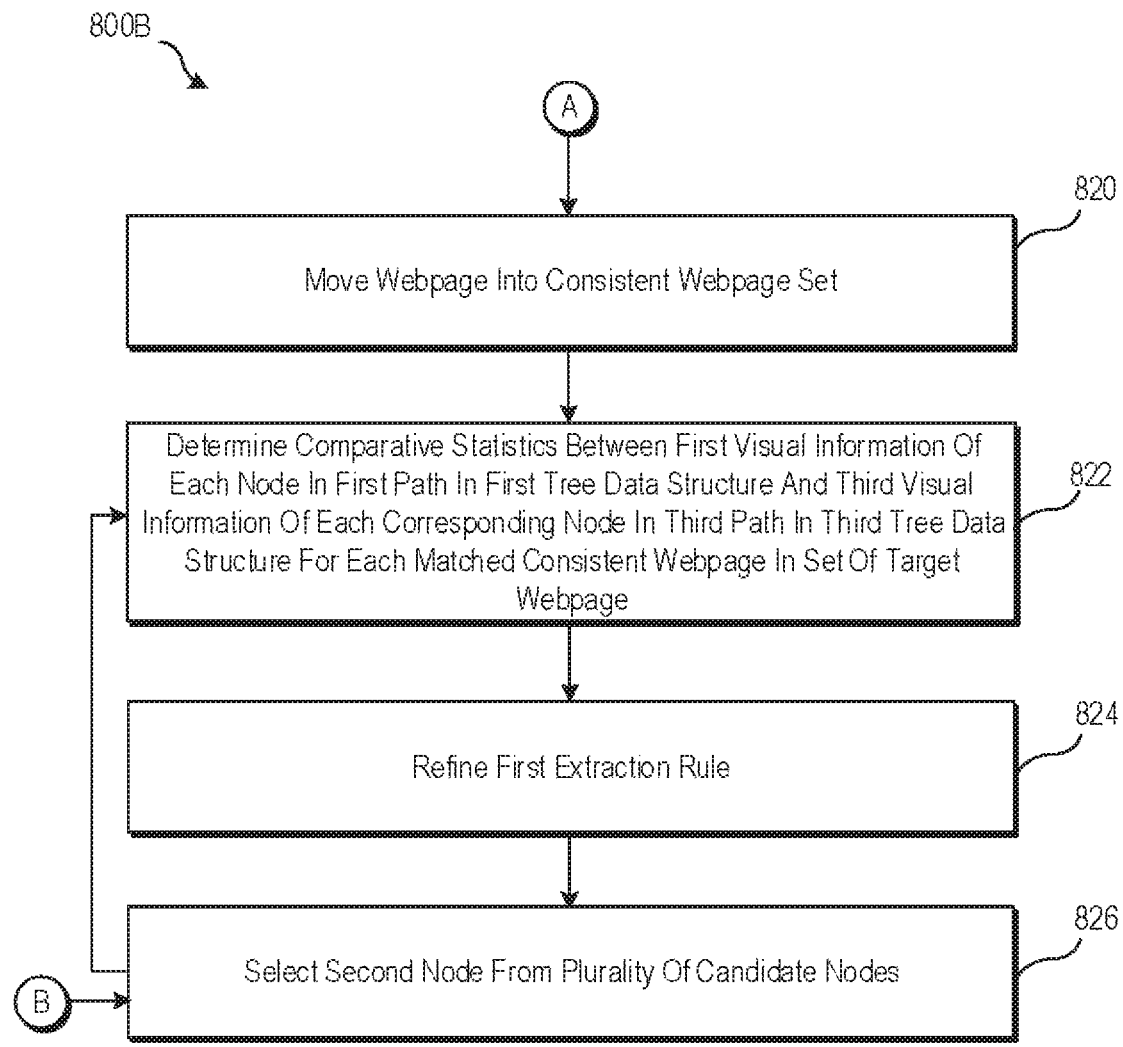

FIGS. 8B and 8C, collectively, illustrate a flowchart of an example method for refining a first extraction rule, arranged in accordance with at least one embodiment described in the present disclosure. FIG. 8 is explained in conjunction with elements from FIG. 1, FIG. 2, FIG. 3A, FIG. 3B, FIG. 3C, FIG. 4A, FIG. 4B, FIG. 5, FIG. 6, FIG. 7, and FIG. 8A. With reference to FIGS. 8B and 8C, there is shown a flowchart 800B. The method illustrated in the flowchart 800B may start at 806 and may be performed by any suitable system, apparatus, or device, such as by the example electronic device 102 of FIG. 1 or FIG. 2. Although illustrated with discrete blocks, the steps and operations associated with one or more of the blocks of the flowchart 800B may be divided into additional blocks, combined into fewer blocks, or eliminated, depending on the particular implementation.

At block 806, one or more first paths may be determined in the first tree data structure, for the one or more first nodes associated with the labelled one or more first items of the first web page 112A. In an embodiment, the processor 204 may be configured to determine the one or more first paths in the first tree data structure, for the one or more first nodes associated with the labelled one or more first items of the first web page 112A. For example, the processor 204 may determine an XPath for each of the one or more first nodes in a DOM tree of the first web page 112A, as the one or more first paths for the one or more first nodes.

At block 808, one or more second paths may be determined in the second tree data structure, for one or more second nodes associated with one or more second items of the second web page 112B. In an embodiment, the processor 204 may be configured to determine the one or more second paths in the second tree data structure, for the one or more second nodes associated with the one or more second items of the second web page 112B. The one or more second items of the second web page 112B may correspond to the one or more first items of the first web page 112A. For example, the processor 204 may determine an XPath for each of the one or more second nodes in a DOM tree of the second web page 112B, as the one or more second paths for the one or more second nodes. In an example, for the second item from the one or more second items of the second web page 112B, the processor 204 may determine the second path 802 in the second tree data structure of the second web page 112B. The second path 802 may correspond to the second node (i.e., the node 802E) that may correspond to the second item on the second web page 112B. The second item may correspond to the first item of the one or more first items of the first web page 112A.

At block 810, a check may be performed to compare whether the one or more first paths in the first tree data structure are same as the one or more second paths in the second tree data structure. In an embodiment, the processor 204 may be configured to compare the one or more first paths in the first tree data structure with the one or more second paths in the second tree data structure to determine if they are the same or not. If the one or more first paths are determined as same as the one or more second paths, control may pass to step 812. Otherwise, control may pass to step 818.

In an example, the processor 204 may compare the first path 804 associated with the first web page 112A with the second path 802 associated with the second web page 112B. For example, on the comparison of the first path 804 with the second path 802 in FIG. 8A, the processor 204 may determine that the node 804A corresponds to the node 802A, the node 804B corresponds to the node 802B, the node 804C corresponds to the node 802C, and the node 804D corresponds to the node 802E. In such case, the processor 204 may determine that the second path 802 may not be same as the first path 804 as the second path 802 may include nodes till five levels (i.e., the node 802A to 802E) and the first path 804 may include nodes till four levels (i.e., the node 804A to 804D).

At block 812, the second web page 112B may be classified as a matched web page in the set of target web pages. In an embodiment, the processor 204 may be configured to classify the second web page 112B as a matched web page in the set of target web pages. For example, the processor 204 may maintain a set of matched web pages in the database 106, the memory 206, the persistent data storage 208, or a combination thereof. In some embodiments, the processor 204 may add the second web page 112B into the set of matched web pages.

At block 814, a consistency associated with a value of each of the one or more second items in the second web page 112B may be determined. In an embodiment, the processor 204 may be configured to determine the consistency associated with the value of each of the one or more second items in the second web page 112B. The determination of the consistency is described further, for example, in FIGS. 9 and 10.

At block 816, the second web page 112B may be moved to a set of inconsistent web pages based on the second web page 112B being an inconsistent web page. In an embodiment, the processor 204 may maintain a set of inconsistent web pages in the database 106, the memory 206, the persistent data storage 208, or a combination thereof. The processor 204 may add the second web page 112B into the set of inconsistent web pages.

At block 818, the second web page 112B may be classified as an unmatched web page in the set of target web pages. In an embodiment, the processor 204 may be configured to classify the second web page 112B as an unmatched web page in the set of target web pages. For example, the processor 204 may maintain a set of unmatched web pages in the database 106, the memory 206, the persistent data storage 208, or a combination thereof. The processor 204 may add the second web page 112B into the set of unmatched web pages. Control may pass to step 826 and step 826 may be repeated for each remaining unmatched web page in the set of unmatched web pages.

At block 820, the second web page 112B may be moved to a set of consistent web pages based on the second web page 112B being a consistent web page. In an embodiment, the processor 204 may maintain a set of consistent web pages in the database 106, the memory 206, the persistent data storage 208, or a combination thereof. The processor 204 may add the second web page 112B into the set of consistent web pages.

At block 822, comparative statistics may be determined between the first visual information of each node in the first path 316 in the first tree data structure and third visual information of each corresponding node in a third path in a third tree data structure. In an embodiment, the processor 204 may be configured to determine the comparative statistics between the first visual information of each node in the first path 316 in the first tree data structure and the third visual information of each corresponding node in the third path in the third tree data structure. Step 822 may be performed if the second web page 112B corresponds to a matched consistent web page in the set of web pages. For every matched consistent web page (i.e., every web page in the set of consistent web pages, hereinafter referred as a third web page), the processor 204 may determine the third path in the third tree data structure associated with the third web page, which may include nodes corresponding to nodes in the first path 316 in the first tree data structure. The processor 204 may determine the third visual information of each corresponding node in the third path and compare the third visual information with the first visual information of each node in the first path 316 to determine the comparative statistics.

For example, with reference to FIGS. 3B and 3C, the processor 204 may determine a <div> node in the third tree data structure, that may correspond to the first <div> node 308 in the tree data structure 300B (e.g., the first tree data structure). Further, in the third tree data structure, the processor 204 may determine a <div> node corresponding to the third <div> node 310B, a <div> node corresponding to the fourth <div> node 312, and a <div> node corresponding to the seventh <div> node 314C. Accordingly, the processor 204 may determine the third path that may correspond to the first path 316. Further, the processor 204 may determine the third visual information of each node in the third path that may correspond to the first visual information 318 of each node in the first path 316.

The processor 204 may be configured to compare the various visual properties associated with the first visual information with corresponding visual properties associated with the third visual information. For example, the processor 204 may compare the visual property "width" of an element (such as, a first text box) in the first web page 112A with a corresponding element (i.e., the first text box) in the third web page. The processor 204 may compare the visual property "width" of the element based on comparison of the first visual information of a node of the element in the first path 316 with the third visual information of a corresponding node of that element in the third path. The processor 204 may perform such comparisons between the first web page 112A and each third web page in the set of consistent web pages to determine statistics for the variation of the visual property "width" for the element amongst the web pages in the set of consistent web pages.

For example, the processor 204 may determine a first count of web pages that may include the element in the same position with the same "width" and a second count of web pages that may include the element in the same position with a slightly different "width" (for e.g., a difference of less than 'p' pixels). The processor 204 may also determine a third count of web pages that may include the element in the same position with a different "width" (for e.g., a difference of larger than 'p' pixels). After determination of the first count, the second count, and the third count, the processor 204 may be configured to normalize the determined first count, second count, and third count into ratios. The processor 204 may determine similar statistics for other visual properties such as, but not limited to, "height", "leftoffset", and "topoffset". Further, the processor 204 may be configured to determine statistics based on number of pages that may include the element in the same position but which may have same or different "background", "id", "name" and other properties. An exemplary experiment data observed for comparative statistics of visual properties "width", "height", "leftoffset", and "rightoffset" is presented in Table 1, as follows:

TABLE 1

Exemplary experimental data for comparative statistics of visual properties

|  | Ratio of web pages with elements of same size | Ratio of web pages with elements of slightly different size | Ratio of web pages with elements of different size |
| --- | --- | --- | --- |
| Width | 1 | 0 | 0 |
| Height | 0.5 | 0.5 | 0 |
| Leftoffset | 1 | 0 | 0 |
| Topoffset | 0 | 0 | 1 |

From Table 1, it may be observed that the "width" of the element (e.g., the first text box) may be the same in all (or 100%) of the web pages in the set of consistent web pages. Further, the "height" of the element (e.g., the first text box) may be same in 50% of the consistent web pages and may be slightly different (say by, p pixels, for example, 10 pixels) in the rest 50% of the consistent web pages. Similarly, the visual properties "leftoffset" and "topoffset" may be same for 100% of consistent web pages and may be different for 100% of consistent web pages, respectively. It should be noted that data provided in Table 1 may merely be taken as experimental data and may not be construed as limiting the present disclosure.

At block 824, the first extraction rule may be refined for the generation of the second extraction rule for the extraction of the second item (i.e. corresponding to the first item) of the second web page 112B. In an embodiment, the processor 204 may be configured to refine the first extraction rule based on the determined comparative statistics and the first visual information associated with each node in the first path 316. The refinement of the first extraction rule to generate the second extraction rule is described further, for example, in FIG. 11.

At block 826, the second node may be selected from the plurality of candidate nodes in the second tree data structure. In an embodiment, the processor 204 may be configured to select the second node from the plurality of candidate nodes. In an embodiment, the processor 204 may be configured to search the plurality of candidate nodes based on the determined comparative statistics, the first visual information, and first contextual constraints associated with the refined first rule (i.e., the generated second rule). The processor 204 may be configured to determine a plurality of candidate paths in the second tree data structure, for the searched plurality of candidate nodes. The processor 204 may be further configured to analyze each of the plurality of candidate paths based on one or more visual features of each node in corresponding candidate path and one or more visual features of each node in the first path. The processor 204 may be configured to select the second node from the searched plurality of candidate nodes based on analysis of the plurality of candidate paths. The processor 204 may determine the second path in the second tree data structure based on the selected second node, may further extract the second item corresponding to the first item based on the second path, and may further store the extracted second item in the database 106. The selection of the second node from the plurality of candidate nodes in the second tree data structure is described further, for example, in FIG. 12. Control may pass to 822 for each remaining web page in the set of consistent web pages and steps 822 to 826 may be iterated for that web page. Control may pass to end when all web pages in the set of consistent web pages are processed. Thus, the extraction of the one or more items may require annotation of a single web page from the crawled set of web pages and web wrapper (i.e., item extraction rules) may be refined incrementally by the disclosed electronic device 102, instead of requiring annotation of multiple web pages manually, thereby saving manual effort and enhancing the extraction process. Further, the dynamic update of web pages may be monitored during rendering by the disclosed electronic device 102, to provide enhanced way for wrapper induction.

Although the flowchart 800B is illustrated as discrete operations, such as 806, 808, 810, 812, 814, 816, 818, 820, 822, 824, and 826. However, in certain embodiments, such discrete operations may be further divided into additional operations, combined into fewer operations, or eliminated, depending on the particular implementation without detracting from the essence of the disclosed embodiments.

Figure 9:
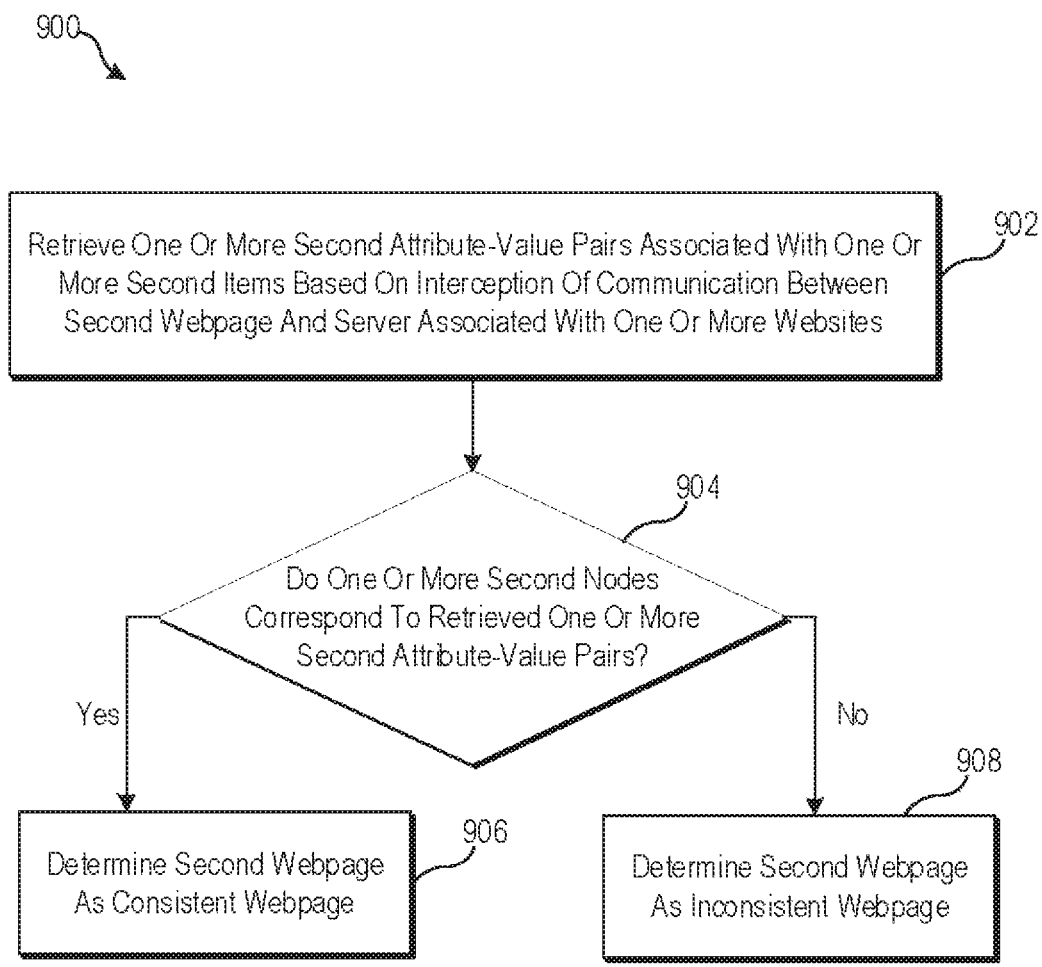
FIG. 9 is a flowchart of an example method for verifying consistency of a dynamic second web page.

FIG. 9 is a flowchart of an example method for verifying consistency of a dynamic second web page, arranged in accordance with at least one embodiment described in the present disclosure. FIG. 9 is explained in conjunction with elements from FIG. 1, FIG. 2, FIG. 3A, FIG. 3B, FIG. 3C, FIG. 4A, FIG. 4B, FIG. 5, FIG. 6, FIG. 7, FIG. 8A, FIG. 8B and FIG. 8C. With reference to FIG. 9, there is shown a flowchart 900. The method illustrated in the flowchart 900 may start at 902 and may be performed by any suitable system, apparatus, or device, such as by the example electronic device 102 of FIG. 1 or FIG. 2. Although illustrated with discrete blocks, the steps and operations associated with one or more of the blocks of the flowchart 900 may be divided into additional blocks, combined into fewer blocks, or eliminated, depending on the particular implementation.

At block 902, one or more second attribute-value pairs associated with the one or more second items may be retrieved. In an embodiment, the processor 204 may be configured to retrieve the one or more second attribute-value pairs associated with the one or more second items based on an interception of a communication between the second web page 112B and the server 104 associated with the one or more web sites. For example, the processor 204 may intercept an XHR response message (i.e. associated with each of the one or more second nodes of the second web page 112B) received by the second web page 112B from the server 104 associated with the one or more web sites. The XHR response message may include a JSON key-value pair, which may correspond to the attribute-value pair associated with the corresponding node from the one or more second nodes. The processor 204 may retrieve the JSON key-value pairs for each of the one or more second nodes as the retrieved one or more second attribute-value pairs. The steps 902 to 908 may be performed for the second web page 112B if the second web page 112B is a dynamic web page. Otherwise, control may pass to end. Further, the steps 902 to 908 may be iterated for each dynamic web page in the set of target web pages, which may be a matched web page.

At block 904, a check may be performed to determine if the one or more second nodes correspond to the retrieved one or more second attribute-value pairs. In an embodiment, the processor 204 may be configured to compare the one or more second nodes in the second tree data structure of the second web page 112B with the retrieved one or more second attribute-value pairs. If the one or more second nodes are determined to correspond to the retrieved one or more second attribute-value pairs, control may pass to step 906. Otherwise, control may pass to step 908.

At block 906, the second web page 112B may be determined as a consistent web page. In an embodiment, the processor 204 may determine the second web page 112B as a consistent web page if the one or more second nodes are determined to correspond to the retrieved one or more second attribute-value pairs. The processor 204 may add the second web page 112B to the set of consistent web pages. In an embodiment, the processor 204 may increment the successful counter (as referred in FIG. 7) in the wrapper rule (e.g., a JSON wrapper rule) of the second extraction rule by 1 for an item in the second page, if a node, from the one or more second nodes is determined to correspond to an attribute-value pair from the retrieved one or more second attribute-value pairs. Control may pass to end.

At block 908, the second web page 112B may be determined as an inconsistent web page. In an embodiment, the processor 204 may determine the second web page 112B as an inconsistent web page if the one or more second nodes do not correspond to the retrieved one or more second attribute-value pairs. The processor 204 may add the second web page 112B to the set of inconsistent web pages. Control may pass to end.

Although the flowchart 900 is illustrated as discrete operations, such as 902, 904, 906, and 908. However, in certain embodiments, such discrete operations may be further divided into additional operations, combined into fewer operations, or eliminated, depending on the particular implementation without detracting from the essence of the disclosed embodiments.

Figure 10:
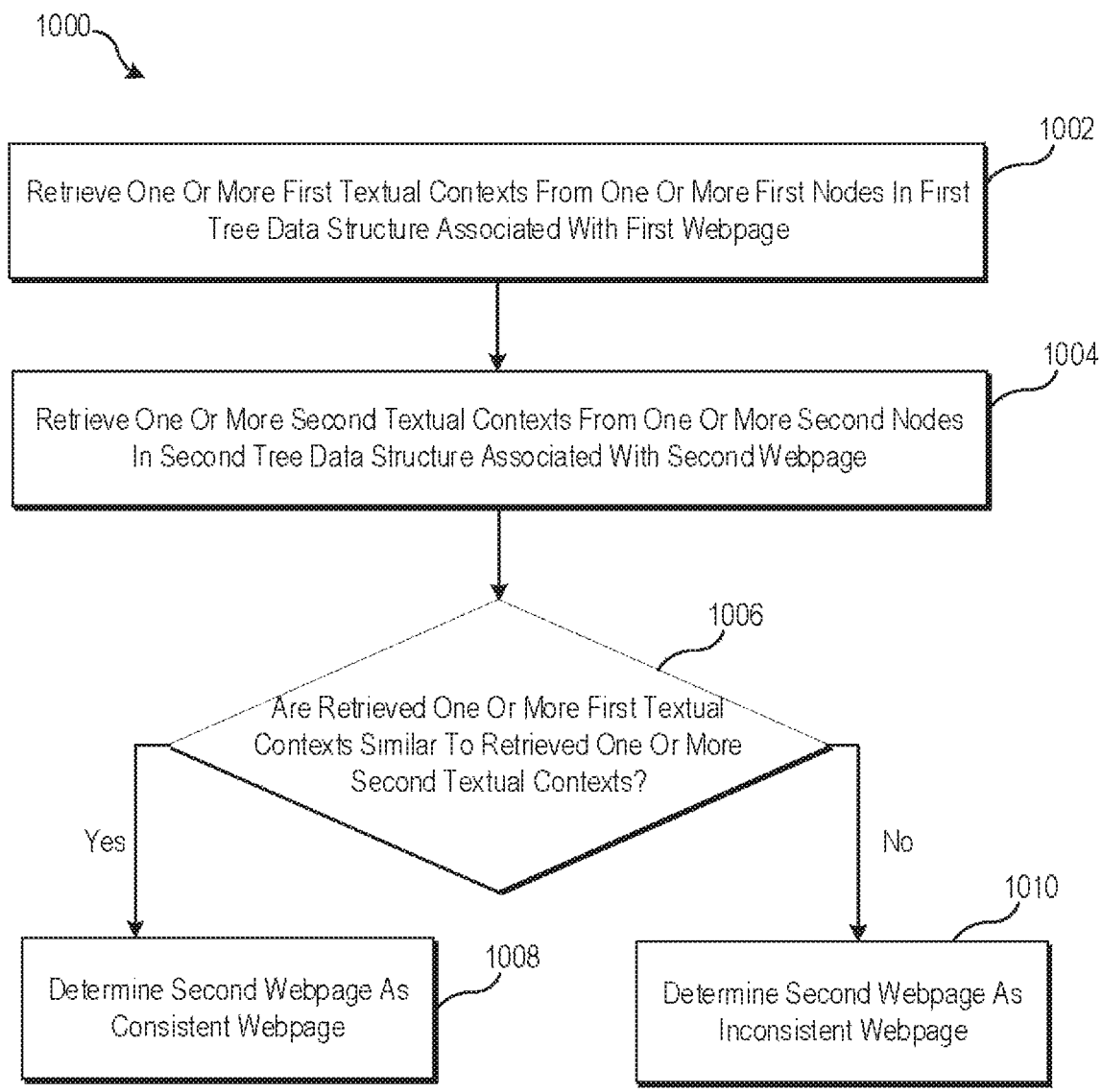
FIG. 10 is a flowchart of an example method for verifying consistency of a non-dynamic second web page.

FIG. 10 is a flowchart of an example method for verifying consistency of a non-dynamic second web page, arranged in accordance with at least one embodiment described in the present disclosure. FIG. 10 is explained in conjunction with elements from FIG. 1, FIG. 2, FIG. 3A, FIG. 3B, FIG. 3C, FIG. 4A, FIG. 4B, FIG. 5, FIG. 6, FIG. 7, FIG. 8A, FIG. 8B, FIG. 8C, and FIG. 9. With reference to FIG. 10, there is shown a flowchart 1000. The method illustrated in the flowchart 1000 may start at 1002 and may be performed by any suitable system, apparatus, or device, such as by the example electronic device 102 of FIG. 1 or FIG. 2. Although illustrated with discrete blocks, the steps and operations associated with one or more of the blocks of the flowchart 1000 may be divided into additional blocks, combined into fewer blocks, or eliminated, depending on the particular implementation.

At block 1002, one or more first textual contexts may be retrieved from the one or more first nodes in the first tree data structure associated with the first web page 112A. In an embodiment, the processor 204 may be configured to retrieve the one or more first textual contexts from the one or more first nodes in the first tree data structure associated with the first web page 112A. For example, the processor 204 may be configured to retrieve textual information embedded or included in a node (e.g., a <div> node) of the one or more first nodes, as a first textual context (e.g., "Writer" in seventh <div> node 314C of FIG. 3B). Similarly, the processor 204 may retrieve the one or more first textual contexts from the one or more first nodes. Steps 1002 to 1010 may be performed for the second web page if the second web page 112B is not a dynamic web page. Otherwise, control may pass to end. Further, the steps 1002 to 1010 may be iterated for each non-dynamic web page in the set of target web pages, which is a matched web page.

At block 1004, one or more second textual contexts may be retrieved from the one or more second nodes in the second tree data structure associated with the second web page 112B. In an embodiment, the processor 204 may be configured to retrieve the one or more second textual contexts from the one or more second nodes in the second tree data structure associated with the second web page 112B. The retrieval of the one or more second textual contexts may be similar to the retrieval of the one or more first textual contexts, as described in the step 1002.

At block 1006, a check may be performed to determine if the retrieved one or more first textual contexts are similar to the retrieved one or more second textual contexts. In an embodiment, the processor 204 may be configured to compare the retrieved one or more first textual contexts with the retrieved one or more second textual contexts. If the retrieved one or more first textual contexts are same as the retrieved one or more second textual contexts, control may pass to step 1008. Otherwise, control may pass to step 1010.

At block 1008, the second web page 112B may be determined as a consistent web page. In an embodiment, the processor 204 may determine the second web page 112B as a consistent web page if the retrieved one or more first textual contexts are same as the retrieved one or more second textual contexts. The processor 204 may add the second web page 112B to the set of consistent web pages. Control may pass to end.

At block 1010, the second web page 112B may be determined as an inconsistent web page. In an embodiment, the processor 204 may determine the second web page 112B as an inconsistent web page if the retrieved one or more first textual contexts are different from the retrieved one or more second textual contexts. The processor 204 may add the second web page 112B to the set of inconsistent web pages. Control may pass to end.

Although the flowchart 1000 is illustrated as discrete operations, such as 1002, 1004, 1006, 1008, and 1010. However, in certain embodiments, such discrete operations may be further divided into additional operations, combined into fewer operations, or eliminated, depending on the particular implementation without detracting from the essence of the disclosed embodiments.

Figure 11:
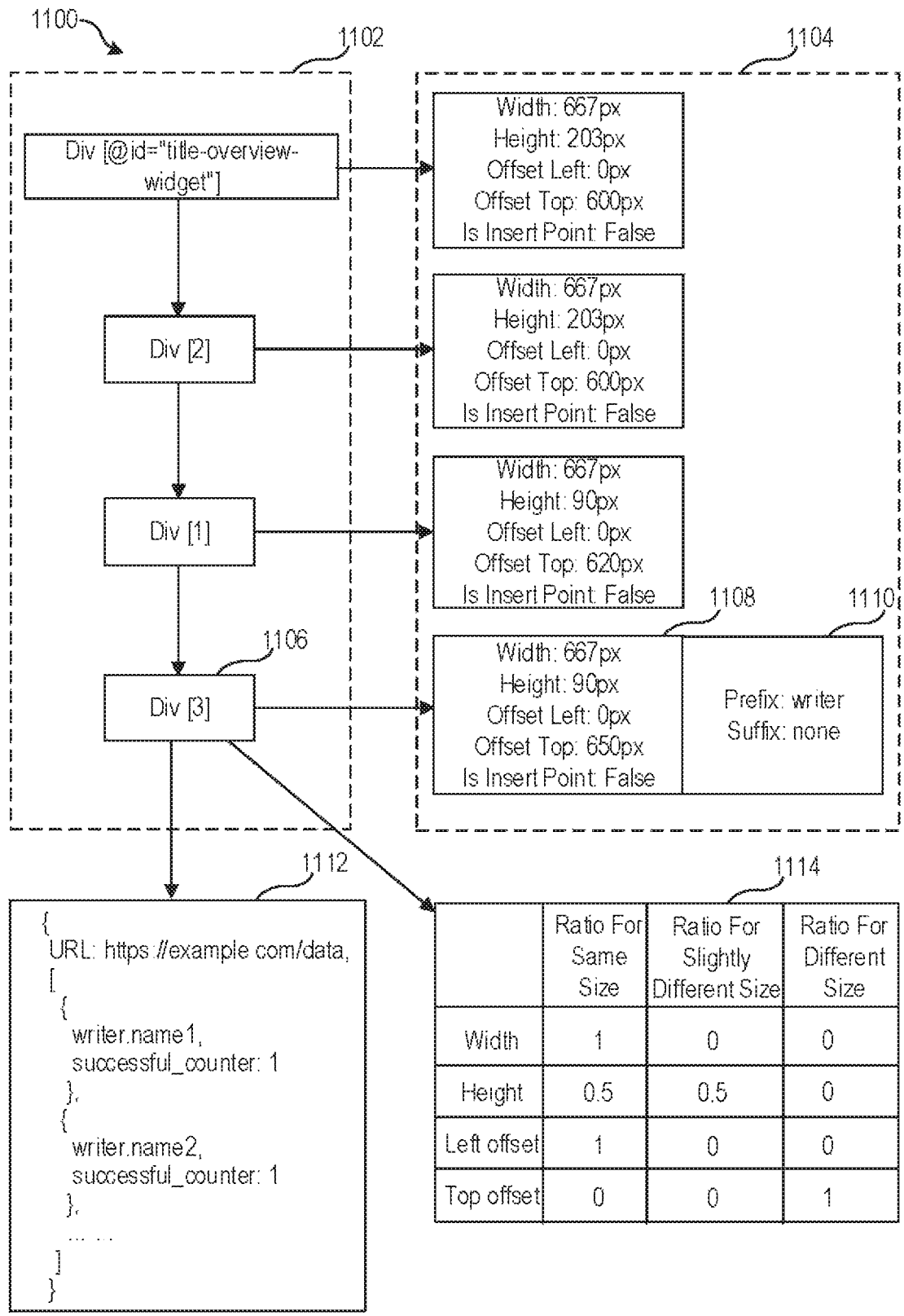
FIG. 11 is a diagram that illustrates a scenario for refining a first extraction rule.

FIG. 11 is a diagram that illustrates a scenario for refining a first extraction rule, arranged in accordance with at least one embodiment described in the present disclosure. FIG. 11 is explained in conjunction with elements from FIG. 1, FIG. 2, FIG. 3A, FIG. 3B, FIG. 3C, FIG. 4A, FIG. 4B, FIG. 5, FIG. 6, FIG. 7, FIG. 8A, FIG. 8B, FIG. 8C, FIG. 9, and FIG. 10. With reference to FIG. 11, there is shown an exemplary first extraction rule 1100. In FIG. 11, there is shown a first path 1102, first visual information 1104 associated with each node in the first path 1102, a first node 1106, first visual properties 1108 associated with the first node 1106, first contextual information 1110 associated with the first node 1106, a JSON wrapper rule 1112, and statistics information 1114.

As shown in FIG. 11, the first extraction rule 1100 may include the first path 1102 for the first node 1106 (e.g., the seventh <div> node 314C of FIG. 3B) for the first item (e.g., the item "Writer") of the first web page 112A (e.g., the web page 300A). The first extraction rule 1100 may further include the first visual information 1104 associated with each node in the first path 1102. Each node in the first path 1102, such as, the first node 1106, may have associated visual properties (e.g., the first visual properties 1108) and contextual information (e.g., the first contextual information 1110). For example, the first visual properties 1108 may include properties, such as, but not limited to, a width, a height, a left offset, a top offset, and a "is insert point"

property. The first contextual information 1110 may include textual context of the first node 1106, such as prefix information (e.g., "Writer") or suffix element information (e.g., none, in case the first item is labelled based on the prefix information).

The first extraction rule 1100 may further include the JSON wrapper rule 1112 for the first item (e.g., "Writer"), which may include a URL of data requested by an XHR request corresponding to a communication intercepted between the first web page 112A and the server 104 associated with the one or more web sites. The JSON wrapper rule 1112 may further include an information list on the first item (e.g., "Writer") to be extracted from the first web page 112A. The information list may include a key in a JSON result of the XHR response (e.g., a key such as "Writer" for the first item 306 as shown in FIG. 3A) and a successful counter, which may be set as "1" for the first extraction rule.

The first extraction rule 1100 may further include the statistics information 1114, which may be the comparative statistics as explained in FIG. 8B (step 818). For example, the statistics information 1114 may include a ratio of a number of consistent target web pages that may include an element corresponding to the labeled first item of the first web page 112A in a same position as that in the first web page 112A, and with a same, slightly different, or different value of a visual property (such as, a width, a height, a left offset, or a top offset).

In an embodiment, the first extraction rule 1100 may include a rule ID and a list of item extraction rules that may include an item name of the first item, such as, "Writer", an ID pointing to the first path 1102 with the first visual information 1104 associated with each node in the first path 1102, contextual information (e.g., the first contextual information 1110 for the first node 1106) associated with each node, and the statistics information 1114. The first extraction rule 1100 may further include an ID pointing to the JSON wrapper rule 1112.

The processor 204 may refine the first extraction rule 1100 to generate the second extraction rule for extraction of the second item, corresponding to the first item, from the second web page 112B, by updating the statistics information 1114 and the successful counters for the second item (e.g., "Writer") in the JSON wrapper rule 1112. For example, in case the second web page 112B is categorized as a consistent web page (as described in the step 812 of FIG. 8B), the processor 204 may update the statistics information 1114 (as described in the step 822 of FIG. 8C) based on the addition of the second web page 112B to the set of consistent web pages. In addition, the processor 204 may increment the successful counter for the second item (as described in the step 906 of FIG. 9) in case the one or more second nodes correspond to the retrieved one or more second attribute-value pairs. The processor 204 may incrementally refine the first extraction rule 1100 based on further update of the statistics information 1114 and the successful counters for an item (which may correspond to the first item) in the JSON wrapper rule 1112 for the remaining target web pages.

It may be noted here that the first extraction rule 1100 shown in FIG. 11 are presented merely as examples and should not be construed to limit the scope of the disclosure.

Figure 12:
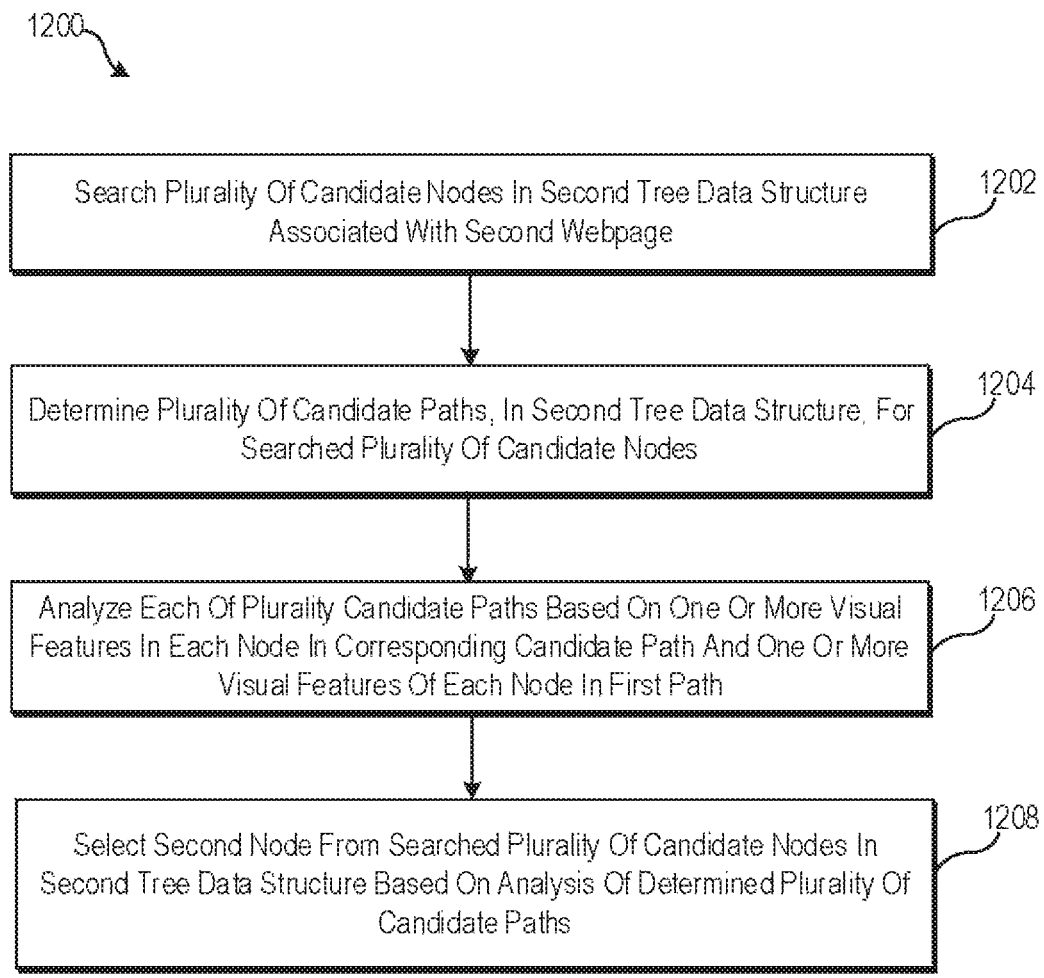
FIG. 12 is a flowchart of an example method for selecting a second node from a plurality of candidate nodes in a second tree data structure of a second web page.

FIG. 12 is a flowchart of an example method for selecting a second node from a plurality of candidate nodes in a second tree data structure of a second web page, arranged in accordance with at least one embodiment described in the present disclosure. FIG. 12 is explained in conjunction with elements from FIG. 1, FIG. 2, FIG. 3A, FIG. 3B, FIG. 3C, FIG. 4A, FIG. 4B, FIG. 5, FIG. 6, FIG. 7, FIG. 8A, FIG. 8B, FIG. 8C, FIG. 9, FIG. 10, and FIG. 11. With reference to FIG. 12, there is shown a flowchart 1200. The method illustrated in the flowchart 1200 may start at 1202 and may be performed by any suitable system, apparatus, or device, such as by the example electronic device 102 of FIG. 1 or FIG. 2. Although illustrated with discrete blocks, the steps and operations associated with one or more of the blocks of the flowchart 1200 may be divided into additional blocks, combined into fewer blocks, or eliminated, depending on the particular implementation.

At block 1202, the plurality of candidate nodes may be searched in the second tree data structure associated with the second web page 112B. In an embodiment, the processor 204 may be configured to search the plurality of candidate nodes in the second tree data structure associated with the second web page 112B based one or more second visual properties and one or more second contextual constraints of the one or more second nodes in the second tree data structure. In an embodiment, the processor 204 may compare the one or more second visual properties and the one or more second contextual constraints with a set of conditions to search the plurality of candidate nodes in the second tree data structure. The set of conditions may be determined based on the comparative statistics determined at step 818 (as shown in FIG. 8C).

In an embodiment, the processor 204 may use the comparative statistics to determine a first set of conditions associated with visual properties of the set of target web pages. For example, with reference to Table 1, the comparative statistics may include ratios of number of consistent web pages that include a given element associated with an item at the same location with the same, slightly different, or different value of a visual property (such as, but not limited to, a width, a height, a left offset, or a right offset). If a ratio of same or slightly different values of a visual property (e.g., width) is above a threshold ratio (e.g., 0.10), the processor 204 may determine a condition for that visual property (e.g., width) based on a threshold range for that visual property. In certain scenarios, the threshold range may be determined based on a variation of values of the visual property in the set of consistent web pages, with respect to a value of the visual property in the first web page 112A. In an embodiment, the condition may include a check whether a value of the visual property of a node (i.e. from the one or more second nodes) in the second tree data structure is within the threshold range with respect to the value of the visual property of a corresponding node (i.e. from the one or more first nodes) in the first tree data structure. In an example, the processor 204 may determine the condition for the visual property "width" as: "Condition 1: Is width difference between an element (associated with a node in the first tree data structure) of the first web page 112A and a corresponding element (associated with a corresponding node in the second tree data structure) is less than "p" (e.g., 20) pixels?". The first set of conditions may include the Condition 1 for width, and other conditions such as, but not limited to, a Condition 2 (e.g., height difference less than 20 pixels), a Condition 3 (e.g., left offset difference less than 20 pixels), and a Condition 4 (e.g., top offset difference less than 20 pixels).

In an embodiment, the processor 204 may determine a second set of conditions associated with contextual constraints of the set of target web pages. The processor 204 may determine the second set of conditions based on the one or more first contextual constraints of the one or more first nodes of the first web page 112A. For example, the second set of conditions may include a condition to check whether an "id" of a node (i.e. from the one or more second nodes) in the second tree data structure, is same as an "id" of a corresponding node (i.e. from the one or more first nodes) in the first tree data structure. In some embodiments, the second set of conditions may include other conditions to check whether the constraints "name" and "background" of the node in the second tree data structure are same as the "name" and "background" of the corresponding node in the first tree data structure.

In an embodiment, the processor 204 may be configured to search the plurality of candidate nodes from the one or more second nodes in the second tree data structure based on comparison of the first set of conditions with the one or more second visual properties and comparison of the second set of conditions with the one or more second contextual constraints. In another embodiment, the processor 204 may be configured to search the plurality of candidate nodes based on the determined comparative statistics and the second visual information associated with each of the plurality of candidate nodes. For example, the processor 204 may determine the plurality of candidate nodes in the second tree data structure based on comparison of the first set of conditions (determined based on the comparative statistics, as explained above) with the second visual information of each of the plurality of candidate nodes. Examples of the plurality of candidate nodes in the second tree data structure of the second web page 112B, for the first node corresponding to the first item of the first web page 112A, is described further, for example, in FIG. 13. An exemplary second data structure including the plurality of candidate nodes for the second item of the second web page 112B, is described further, for example, in FIG. 16.

At block 1204, the plurality of candidate paths may be determined for the searched plurality of candidate nodes in the second tree data structure. In an embodiment, the processor 204 may be configured to determine the plurality of candidate paths, in the second tree data structure, for the searched plurality of candidate nodes. For example, the processor 204 may determine an XPath associated with each of the plurality of candidate nodes in the second tree data structure (e.g., a DOM tree) of the second web page 112B, as the plurality of candidate paths.

At block 1206, each of the determined plurality of candidate paths may be analyzed. In an embodiment, the processor 204 may be configured to analyze each of the determined plurality of candidate paths based on one or more visual features of each node in a corresponding candidate path, and one or more visual features of each node in the first path 316. In an embodiment, the processor 204 may be configured to determine a comparison score of each of the plurality of candidate paths based on a comparison of a visual feature of each node in each of the plurality candidate paths and a visual feature of each corresponding node of the first path 316.

For example, the processor 204 may compare each visual feature (i.e., a visual property, such as, but not limited to, width, height, left offset, or top offset) of each node in a first candidate path (i.e. associated with a first candidate node) with the corresponding visual feature of a corresponding node in the first path 316 (i.e. associated with the first node). The processor 204 may be further configured to determine a sum of comparison scores of the each of the one or more visual features of the node in the first candidate path. The processor 204 may be configured to determine a total comparison score of all nodes in the first candidate path. The processor 204 may further normalize the total comparison score, as a normalized candidate path score given by equation (1):

$$\text{Normalized candidate path score} = \frac{\text{Total comparison score}}{\text{XPath length of the first path}} \quad (1)$$

In an embodiment, the comparison score of each node in the first candidate path may be based on a FScore of XPath (i.e., the first path) of the first item labelled in the first web page 112A. In an embodiment, the processor 204 may be configured to use, but not limited to, a dynamic programming technique to determine the candidate path score (i.e., a normalized candidate path score) of each candidate path in the plurality of candidate nodes. An exemplary pseudo-code associated with the determination of the normalized candidate path score of a candidate path is described further, for example, in FIG. 14.

At block 1208, the second node may be selected from the searched plurality of candidate nodes in the second tree data structure based on the analysis of the determined plurality of candidate paths. In an embodiment, the processor 204 may be configured to select the second node, in the second tree data structure, from the searched plurality of candidate nodes based on the analysis of the determined plurality of candidate paths. In an embodiment, the processor 204 may be configured to compare the candidate path scores of each of the plurality of candidate paths, and further select the second node as a node that corresponds to a candidate path with a highest candidate path score. The candidate path corresponding to the selected second node may be the second path. For example, in case the candidate path scores of three candidate paths are "1", "0.2", and "0", respectively, the processor 204 may select the first candidate path with the candidate path score of "1" as the second path corresponding to the second node. An example of the second path is described further, for example, in FIG. 15. Control may pass to end.

Although the flowchart 1200 is illustrated as discrete operations, such as 1202, 1204, 1206, and 1208. However, in certain embodiments, such discrete operations may be further divided into additional operations, combined into fewer operations, or eliminated, depending on the particular implementation without detracting from the essence of the disclosed embodiments.

Figure 13:
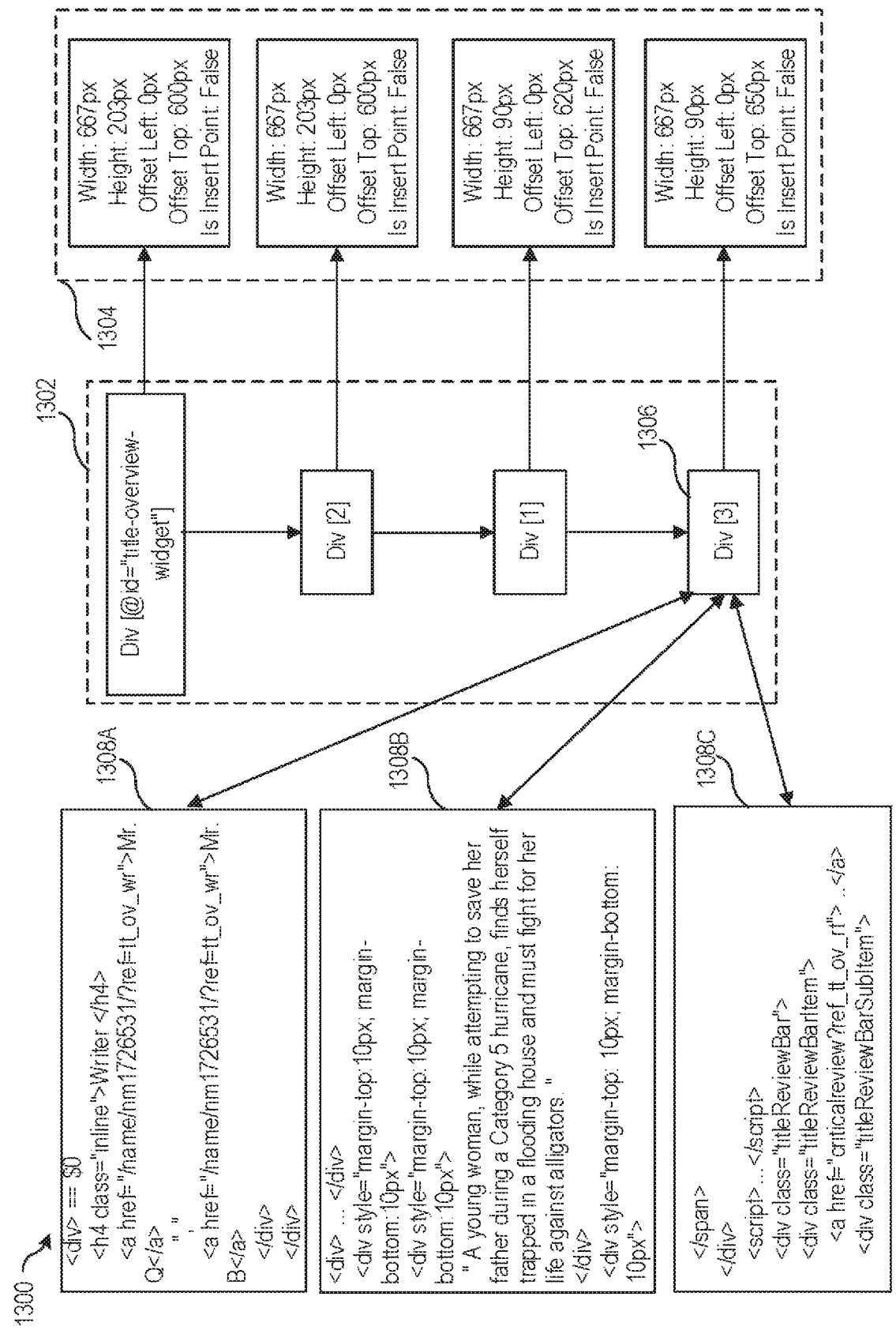
FIG. 13 is a diagram that illustrates an exemplary scenario of a plurality of candidate nodes in a second tree data structure of a second web page, for a first node corresponding to a first item of a first web page.

FIG. 13 is a diagram that illustrates an exemplary scenario of a plurality of candidate nodes in a second tree data structure of a second web page, for a first node corresponding to a first item of a first web page, arranged in accordance with at least one embodiment described in the present disclosure. FIG. 13 is explained in conjunction with elements from FIG. 1, FIG. 2, FIG. 3A, FIG. 3B, FIG. 3C, FIG. 4A, FIG. 4B, FIG. 5, FIG. 6, FIG. 7, FIG. 8A, FIG. 8B, FIG. 8C, FIG. 9, FIG. 10, FIG. 11, and FIG. 12. With reference to FIG. 13, there is shown an exemplary scenario 1300. As shown in FIG. 13, the exemplary scenario 1300 may include a first path 1302 for a first node 1306 in the first tree data structure of the first web page 112A, and first visual information 1304 for each node in the first path 1302. Further, there is further shown in FIG. 13, a first candidate node 1308A, a second candidate node 1308B, and a third candidate node 1308C as the plurality of candidate nodes in the second tree data structure for the first node 1306.

In an example, the first candidate node 1308A may be selected as a candidate node as a width difference between the first candidate node 1308A and the first node 1306 may be less than 20 pixels. In another example, the second candidate node 1308B may be selected as a candidate node as a height difference between the second candidate node 1308B and the first node 1306 may be less than 20 pixels. Further, in another example, the third candidate node 1308C may be selected as a candidate node as a left offset difference between the third candidate node 1308C and the first node 1306 may be less than 20 pixels.

It may be noted here that the first candidate node 1308A, the second candidate node 1308B, and the third candidate node 1308C shown in FIG. 13 are presented merely as examples and should not be construed to limit the scope of the disclosure.

FIG. 14 is a diagram that illustrates an exemplary pseudo-code associated with a determination of a normalized candidate path score of a candidate path for a candidate node in a second tree data structure of a second web page, arranged in accordance with at least one embodiment described in the present disclosure. FIG. 14 is explained in conjunction with elements from FIG. 1, FIG. 2, FIG. 3A, FIG. 3B, FIG. 3C, FIG. 4A, FIG. 4B, FIG. 5, FIG. 6, FIG. 7, FIG. 8A, FIG. 8B, FIG. 8C, FIG. 9, FIG. 10, FIG. 11, FIG. 12, and FIG. 13. With reference to FIG. 14, there is shown an exemplary pseudo-code 1400. As shown in FIG. 14, the exemplary pseudo-code 1400 may include a first function 1402 and a second function 1404.

The processor 204 may be configured to execute the first function 1402 to recursively determine a candidate path score of the candidate path. For example, as shown in 1406 in FIG. 14, the processor 204 may recursively execute the first function 1402 for the various nodes in the candidate path and corresponding nodes in the first path (such as the first path 1302 shown in FIG. 13). Such recursive execution (as shown in 1406 in FIG. 14) of the first function 1402 may correspond to the dynamic programming technique. Further, the processor 204 may be configured execute the second function 1404 to determine a comparison score associated with a degree of similarity of a value of each visual feature of a node of the candidate path, with respect to a value of the corresponding visual feature of a corresponding node of the first path 1302.

It may be noted here that the pseudo-code 1400 described in FIG. 14 is merely provided as an example. However, there may be several types of possible pseudo-codes to obtain the same objective of determination of the candidate path score of the candidate path, without departure from the scope of the present disclosure.

Figure 15:
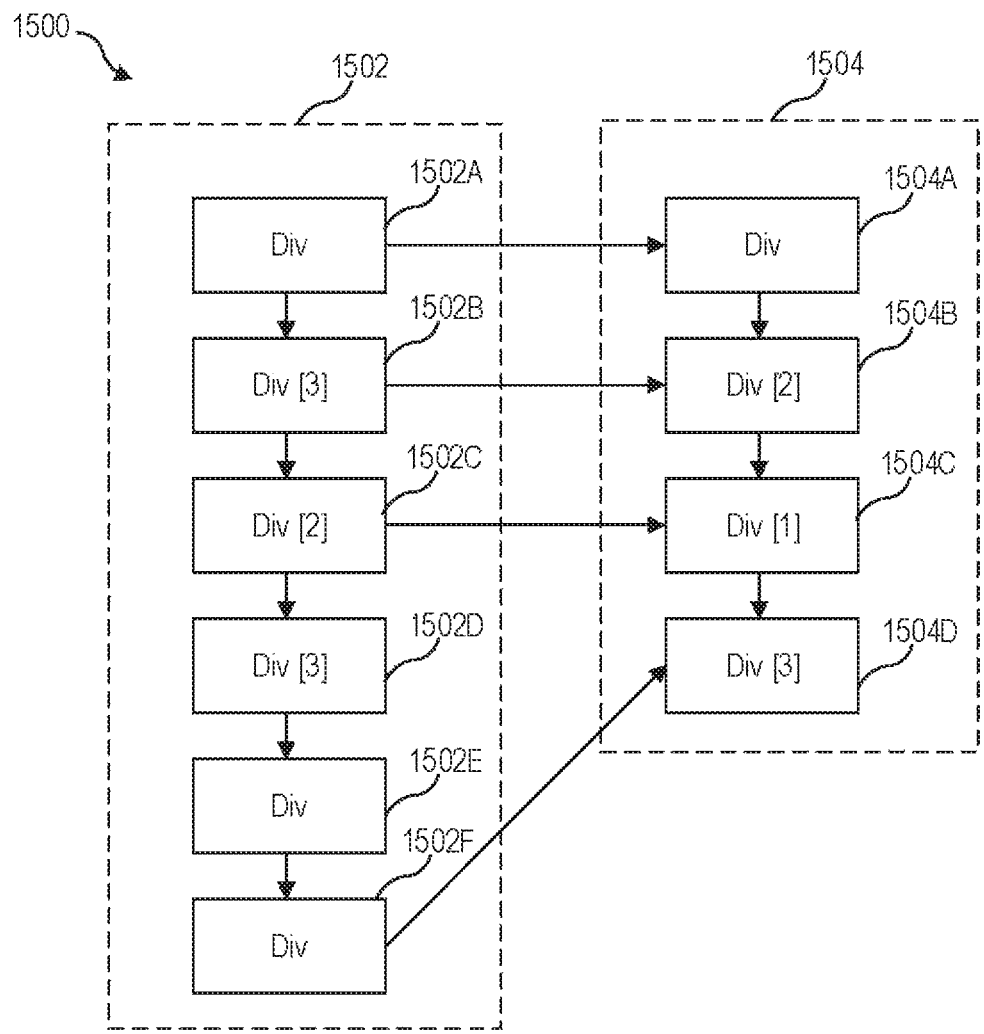
FIG. 15 is a diagram that illustrates an exemplary scenario of a second path for a second node selected from a plurality of candidate nodes in a second tree data structure of a second web page.

FIG. 15 is a diagram that illustrates an exemplary scenario of a second path for a second node selected from a plurality of candidate nodes in a second tree data structure of a second web page, arranged in accordance with at least one embodiment described in the present disclosure. FIG. 15 is explained in conjunction with elements from FIG. 1, FIG. 2, FIG. 3A, FIG. 3B, FIG. 3C, FIG. 4A, FIG. 4B, FIG. 5, FIG. 6, FIG. 7, FIG. 8A, FIG. 8B, FIG. 8C, FIG. 9, FIG. 10, FIG. 11, FIG. 12, FIG. 13, and FIG. 14. With reference to FIG. 15, there is shown an exemplary scenario 1500. As shown in FIG. 15, the exemplary scenario 1500 may include a second path 1502 and a first path 1504 (i.e. similar to the first path 316 of FIG. 3A or first path 1302 of FIG. 13).

As shown in FIG. 15, the second path 1502 may be an XPath "Div/Div[3]/Div[2]/Div[3]/Div/Div" in the second tree data structure (e.g., a DOM tree) of the second web page 112B. Further, as shown in FIG. 15, the first path 1504 may be an XPath "Div/Div[2]/Div[1]/Div[3]" in the first tree data structure (e.g., a DOM tree) of the first web page 112A. The second path 1502 may include a node 1502A, a node 1502B, a node 1502C, a node 1502D, a node 1502E, and a node 1502F. The first path 1504 may include a node 1504A, a node 1504B, a node 1504C, and a node 1504D. As shown in FIG. 15, visual information of the node 1502A may be similar to visual information of the node 1504A. Further, visual information of each of the node 1502B and the node 1502C may be similar to corresponding visual information of each of the node 1504B and the node 1504C, respectively. Visual information of the node 1502F may be similar to visual information of the node 1504D. The node 1502F may be the second node corresponding to the second path 1502. In an embodiment, the processor 204 may be further configured to select the second node (i.e., node 1502F) from the searched plurality of candidate nodes in the second tree data structure based on the analysis of the determined plurality of candidate paths, as described in FIG. 12. The processor 204 may determine the second path 1502 that may correspond to the second node (i.e., the node 1502F) in the second tree data structure.

It may be noted here that the second path 1502 and the first path 1504 shown in FIG. 15 are merely presented as example and should not be construed to limit the scope of the disclosure.

FIG. 16 is a diagram that illustrates an exemplary second tree data structure including a plurality of candidate nodes for a second item of a second web page, arranged in accordance with at least one embodiment described in the present disclosure. FIG. 16 is explained in conjunction with elements from FIG. 1, FIG. 2, FIG. 3A, FIG. 3B, FIG. 3C, FIG. 4A, FIG. 4B, FIG. 5, FIG. 6, FIG. 7, FIG. 8A, FIG. 8B, FIG. 8C, FIG. 9, FIG. 10, FIG. 11, FIG. 12, FIG. 13, FIG. 14, and FIG. 15. With reference to FIG. 16, there is shown an exemplary second tree data structure 1600. As shown in FIG. 16, the exemplary second tree data structure 1600 may include a first <div> node 1602A, a second <div> node 1602B, and a third <div> node 1602C.

In an embodiment, the second tree data structure 1600 may be a DOM tree including an HTML content of the second web page 112B in an XML format and may include a plurality of <div> nodes. The first <div> node 1602A may correspond to the second candidate node 1308B (in FIG. 13) and the third <div> node 1602C may correspond to the first candidate node 1308A (in FIG. 13) in the second tree data structure 1600. In an example, the processor 204 may select the third <div> node 1602C (i.e., the first candidate node 1308A) as the second node. The processor 204 may determine an XPath for the selected second node (e.g., the third <div> node 1602C) as the second path 1502 (i.e., "Div/Div [3]/Div[2]/Div[3]/Div/Div") shown in FIG. 15. Further, the processor 204 may extract the second item "Writer" as "Mr. Q Mr. B" from the second tree data structure associated with the second web page 112B.

In an embodiment, the processor 204 may determine the second extraction rule (i.e., the refined first extraction rule) as the second path 1502 and the second visual information associated with each node (e.g., the second properties of each node) in the second path 1502. By use of the visual information (e.g., the second visual information) in addition to the tree data structure (e.g., the second path for the second node), the processor 204 may provide a robust web wrapper which may be independent of variations in positions or placements of an item amongst different web pages of similar category. Further, the visual feature and dynamic programming based determination of the second node and the extraction of the second item (i.e. based on the second path of the second node) performed by the disclosed electronic device 102, may further enhance the process of information extraction from the second tree data structure of the second web page 112B.

It may be noted here that the second tree data structure 1600 shown in FIG. 16 is presented merely as an example and should not be construed to limit the scope of the disclosure.

Various embodiments of the disclosure may provide one or more non-transitory computer-readable storage media configured to store instructions that, in response to being executed, cause a system (such as the example electronic device 102) to perform operations. operations may include crawling a set of web pages associated with one or more web sites of a category. The operations may further include selecting a first web page, as a sample page, from the crawled set of web pages. The selected first web page may include a first set of items, and each of the first set of items may correspond to a node in a first tree data structure associated with presentation of the first set of items in the first web page. The operations may further include receiving a user input and labelling one or more first items from the first set of items in the selected first web page based on the received user input. The operations may further include generating a first extraction rule to extract a first item from the labelled one or more first items. The first extraction rule may include a first path, in the first tree data structure, for a first node associated with the first item, and may further include first visual information associated with each node in the first path. The operations may further include selecting a second web page, from a set of target web pages included in the crawled set of web pages. The operations may further include comparing the first visual information associated with each node in the first path with second visual information associated with each of a plurality of candidate nodes in a second tree data structure associated with the selected second web page. The operations may further include selecting a second node from the plurality of candidate nodes in the second tree data structure based on the comparison. The selected second node may correspond to the first item. The operations may further include refining the first extraction rule to generate a second extraction rule for extraction of a second item from the selected second web page. The second extraction rule may include a second path for the selected second node in the second tree data structure and the second visual information for each node in the second path.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
crawling a set of web pages associated with one or more web sites of a category;
selecting a first web page, as a sample page, from the crawled set of web pages, wherein the selected first web page includes a first set of items, and each of the first set of items corresponds to a node in a first tree data structure which is associated with presentation of the first set of items in the first web page;
receiving a user input and labelling one or more first items from the first set of items in the selected first web page based on the received user input;
generating a first extraction rule to extract a first item from the labelled one or more first items, wherein the first extraction rule includes a first path, in the first tree data structure, for a first node associated with the first item, and further includes first visual information associated with each node in the first path;
selecting a second web page, from a set of target web pages included in the crawled set of web pages;
comparing the first visual information associated with each node in the first path with second visual information associated with each of a plurality of candidate nodes in a second tree data structure associated with the selected second web page;
selecting a second node from the plurality of candidate nodes in the second tree data structure based on the comparison, wherein the selected second node corresponds to the first item; and
refining the first extraction rule to generate a second extraction rule for extraction of a second item from the selected second web page, wherein the second extraction rule includes a second path for the selected second node in the second tree data structure and further includes the second visual information for each node in the second path.

2. The method according to claim 1, wherein the crawling of the set of web pages further comprising:
extracting hypertext content of each of the crawled set of web pages;
determining whether a web page from the crawled set of web pages is dynamic based on the extracted hypertext content;
intercepting a communication between the web page and a server associated with the one or more web sites based on the determination that the web page is dynamic; and
identifying an updated node in a tree data structure of the web page based on the interception of the communication.

3. The method according to claim 1, wherein the labelling of the one or more first items further comprising:
identifying one or more first nodes, corresponding to the labelled one or more first items, in the first tree data structure associated with the first web page;
determining one or more first properties of each of the one or more first nodes from the first tree data structure, wherein the one or more first properties include one or more first visual properties and one or more first contextual constraints associated with the one or more first nodes, and wherein the first visual information corresponds to the one or more first properties for the first node included in the one or more first nodes; and
matching the one or more first nodes with respective one or more first attribute-value pairs associated with the labelled one or more first items, wherein the one or more first attribute-value pairs are retrieved based on an interception of a communication between the first web page and a server associated with the one or more web sites.

4. The method according to claim 3, wherein the matching of the one or more first nodes further comprising:
identifying each updated node from the one or more first nodes based on the interception of the communication;
matching a value of an attribute-value pair associated with the identified node with a corresponding labelled item from the one or more first items; and
recording an attribute of the attribute-value pair associated with the identified updated node.

5. The method according to claim 4, wherein the identifying each updated node from the one or more first nodes is further based on a timestamp associated with the intercepted communication.

6. The method according to claim 1, wherein the refining the first extraction rule further comprising:
determining one or more first paths, in the first tree data structure, for one or more first nodes associated with the labelled one or more first items in the first web page;
determining one or more second paths, in the second tree data structure, for one or more second nodes associated with one or more second items in the second web page, wherein the one or more second items correspond to the one or more first items in the first web page;
comparing each of the one or more second paths for the one or more second nodes with each of the one or more first paths for the one or more first nodes; and
classifying the second web page as a matched web page or an unmatched web page in the set of target web pages based on the comparison.

7. The method according to claim 6, further comprising determining a consistency associated with a value of each of the one or more second items in the second web page, based on the second web page being classified as the matched web page.

8. The method according to claim 7, wherein the determination of the consistency further comprising:
retrieving one or more second attribute-value pairs associated with the one or more second items based on an interception of a communication between the second web page and a server associated with the one or more web sites;
comparing the one or more second nodes with the retrieved one or more second attribute-value pairs associated with the one or more second items; and
determining the second web page as a consistent web page or an inconsistent web page based on the comparison of the one or more second nodes with the retrieved one or more second attribute-value pairs.

9. The method according to claim 7, wherein the determination of the consistency further comprises:
retrieving one or more first textual contexts from the one or more first nodes in the first tree data structure, associated with the first web page;
retrieving one or more second textual contexts from the one or more second nodes in the second tree data structure, associated with the second web page;
comparing the retrieved one or more first textual contexts with the retrieved one or more second textual contexts; and
determining the second web page as a consistent web page or an inconsistent web page based on the comparison of the retrieved one or more first textual contexts and the retrieved one or more second textual contexts.

10. The method according to claim 6, further comprising: determining comparative statistics between the first visual information of each node in the first path in the first tree data structure and third visual information of each corresponding node in a third path in a third tree data structure, for each matched web page of the set of target web pages.

11. The method according to claim 10, further comprising searching the plurality of candidate nodes in the second tree data structure based on the determined comparative statistics and the second visual information associated with each of the plurality of candidate nodes.

12. The method according to claim 6, further comprising:
   searching the plurality of candidate nodes in the second tree data structure associated with the second web page based on one or more second visual properties and one or more second contextual constraints of the one or more second nodes;
   determining a plurality of candidate paths, in the second tree data structure, for the searched plurality of candidate nodes;
   analyzing each of the determined plurality of candidate paths based on one or more visual features of each node in corresponding candidate path and one or more visual features of each node in the first path; and
   selecting the second node from the searched plurality of candidate nodes in the second tree data structure based on the analysis of the determined plurality of candidate paths.

13. The method according to claim 12, wherein the analyzing each of the determined plurality of candidate paths further comprising:
   determining a comparison score of each of the plurality of candidate paths based on a comparison of a visual feature of each node in each of the plurality candidate paths and a visual feature of each corresponding node of the first path; and
   selecting one of the plurality of candidate paths as the second path based on the determined comparison scores, wherein the second path is associated with the selected second node.

14. The method according to claim 13, wherein the comparison score of the second path is highest among the comparison scores of the plurality of candidate paths.

15. The method according to claim 1, further comprising:
   extracting the second item in the second web page based on the second path included in the second extraction rule; and
   storing the extracted second item.

16. One or more non-transitory computer-readable storage media configured to store instructions that, in response to being executed, cause a system to perform operations, the operations comprising:
   crawling a set of web pages associated with one or more web sites of a category;
   selecting a first web page, as a sample page, from the crawled set of web pages, wherein the selected first web page includes a first set of items, and each of the first set of items corresponds to a node in a first tree data structure which is associated with presentation of the first set of items in the first web page;
   receiving a user input and labelling one or more first items from the first set of items in the selected first web page based on the received user input;
   generating a first extraction rule to extract a first item from the labelled one or more first items, wherein the first extraction rule includes a first path, in the first tree data structure, for a first node associated with the first item, and further includes first visual information associated with each node in the first path;
   selecting a second web page, from a set of target web pages included in the crawled set of web pages;
   comparing the first visual information associated with each node in the first path with second visual information associated with each of a plurality of candidate nodes in a second tree data structure associated with the selected second web page;
   selecting a second node from the plurality of candidate nodes in the second tree data structure based on the comparison, wherein the selected second node corresponds to the first item; and
   refining the first extraction rule to generate a second extraction rule for extraction of a second item from the selected second web page, wherein the second extraction rule includes a second path for the selected second node in the second tree data structure and further includes the second visual information for each node in the second path.

17. The one or more computer-readable storage media according to claim 16, wherein the operations further comprising:
   extracting the second item in the second web page based on the second path included in the second extraction rule; and
   storing the extracted second item.

18. The one or more computer-readable storage media according to claim 16, wherein the operations further comprising:
   determining comparative statistics between the first visual information of each node in the first path in the first tree data structure and third visual information of each corresponding node in a third path in a third tree data structure, for each matched web page of the set of target web pages; and
   searching the plurality of candidate nodes in the second tree data structure based on the determined comparative statistics and the second visual information associated with each of the plurality of candidate nodes.

19. An electronic device, comprising:
   a processor configured to:
      crawl a set of web pages associated with one or more web sites of a category;
      select a first web page, as a sample page, from the crawled set of web pages, wherein the selected first web page includes a first set of items, and each of the first set of items corresponds to a node in a first tree data structure which is associated with presentation of the first set of items in the first web page;
      receive a user input and label one or more first items from the first set of items in the selected first web page based on the received user input;
      generate a first extraction rule to extract a first item from the labelled one or more first items, wherein the first extraction rule includes a first path, in the first tree data structure, for a first node associated with the first item, and further includes first visual information associated with each node in the first path;
      select a second web page, from a set of target web pages included in the crawled set of web pages;
      compare the first visual information associated with each node in the first path with second visual information associated with each of a plurality of candidate nodes in a second tree data structure associated with the selected second web page;
      select a second node from the plurality of candidate nodes in the second tree data structure based on the comparison, wherein the selected second node corresponds to the first item; and
      refine the first extraction rule to generate a second extraction rule for extraction of a second item from the selected second web page, wherein the second extraction rule includes a second path for the selected second node in the second tree data structure and further includes the second visual information for each node in the second path.

20. The electronic device according to claim 19, wherein the processor is further configured to:
   extract the second item in the second web page based on the second path included in the second extraction rule; and
   store the extracted second item.

* * * * *